(12) United States Patent
Boerner

(10) Patent No.: US 7,818,224 B2
(45) Date of Patent: Oct. 19, 2010

(54) METHOD AND SYSTEM TO IDENTIFY DISCRETE TRENDS IN TIME SERIES

(76) Inventor: Sean T. Boerner, 1514 Misty Glen, Corinth, TX (US) 76210

( * ) Notice: Subject to any disclaimer, the term of this patent is extended or adjusted under 35 U.S.C. 154(b) by 2127 days.

(21) Appl. No.: 09/815,360

(22) Filed: Mar. 22, 2001

(65) Prior Publication Data
US 2003/0009399 A1 Jan. 9, 2003

(51) Int. Cl.
*G06Q 40/00* (2006.01)
(52) U.S. Cl. .............................. 705/35; 705/36; 705/37
(58) Field of Classification Search ................... 705/35, 705/36, 37
See application file for complete search history.

(56) References Cited

U.S. PATENT DOCUMENTS

| | | | | |
|---|---|---|---|---|
| 5,956,702 | A * | 9/1999 | Matsuoka et al. | 706/22 |
| 6,078,904 | A * | 6/2000 | Rebane | 705/36 R |
| 6,161,098 | A * | 12/2000 | Wallman | 705/36 T |
| 7,167,838 | B1 * | 1/2007 | Gatto | 705/36 R |

OTHER PUBLICATIONS

Abarbanel, Henry D. I., Reggie Brown, John J. Sidorowich and Lev Sh. Tsimring, 1993, "The analysis of observed chaotic data in physical systems", *Rev. Mod. Phys.*, v. 65, No. 4, Oct. 1993, pp. 1331-1993.
Chong, Edwin K. P. and Stanislaw H. Zak, *An Introduction to Optimization*, John Wiley & Sons, Inc., New York, 1996.
Kostelich, Eric. J. and James A. Yorke, 1990, "Noise reduction: finding the simplest dynamical system consistent with the data", *Physica D* v. 41, pp. 183-196.
Maybeck, Peter S., *Stochastic Models, Estimation, and Control*: vol. 1, Academic Press, New York, 1979.
Miller, Ronald E., *Optimization: Foundations and Applications*, John Wiley & Sons, Inc., New York, 2000.
Nocedal, Jorge and Stephen J. Wright, *Numerical Optimization*, Springer-Verlag, New York, 1999.
Press, William H., Brian P. Flannery, Saul A. Teukolsky, and William T. Vetterling, *Numberical Recipes in C: The Art of Scientific Computing*, Cambridge University Press, 1989.
Sarle, W. S., "Neural Networks and Statistical Models" *in Proceedings of the Nineteenth Annual SAS Users Group International Conference*, Apr. 1994, pp. 1538-1550. ftp://ftp.sas.com./pub/neural/neurall.ps.

(Continued)

*Primary Examiner*—Nga B. Nguyen
(74) *Attorney, Agent, or Firm*—Rick B. Yeager

(57) ABSTRACT

A signal processing system and method for breaking a time series into piece-wise discrete trends and determining whether new data represents the continuation of a trend. The method identifies and utilizes at least one set of trend determination parameters, which have favorable trend fit characteristics relative to other possible sets of parameters. In a semi-automated embodiment, the error and trend length characteristics are cross-plotted for multiple sets of possible parameters, and one or more of the parameter sets is selected from the graph. In an automated embodiment, an objective function is formulated from the characteristics, and an optimization technique is applied to identify one or more good parameter sets.

25 Claims, 13 Drawing Sheets

OTHER PUBLICATIONS

Tarantola, Albert, *Inverse Problem Theory: Methods for Data Fitting and Model Parameter Estimation*, Elsevier New York, 1998.

Wolberg, John R., *Expert Trading Systems: Modeling Financial Markets with Kernel Regression*, John Wiley & Sons, Inc., New York, 2000.

U.S. Patent No. 5,956,702, issued Sep. 21, 1999 to Matsuoka and Golea for "Time-series trend estimating system and method using column-structured recurrent neural network".

U.S. Patent No. 5,537,368, issued Jul. 16, 1996 to O'Brien et al for "Enhanced adaptive statistical filter providing improved performance for target motion analysis noice discrimination".

\* cited by examiner

For the first trend:
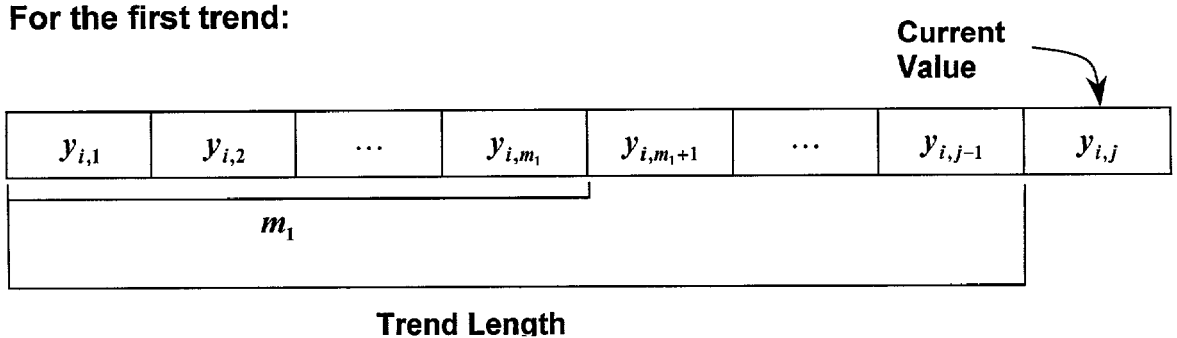
Trend Length
For subsequent trends:
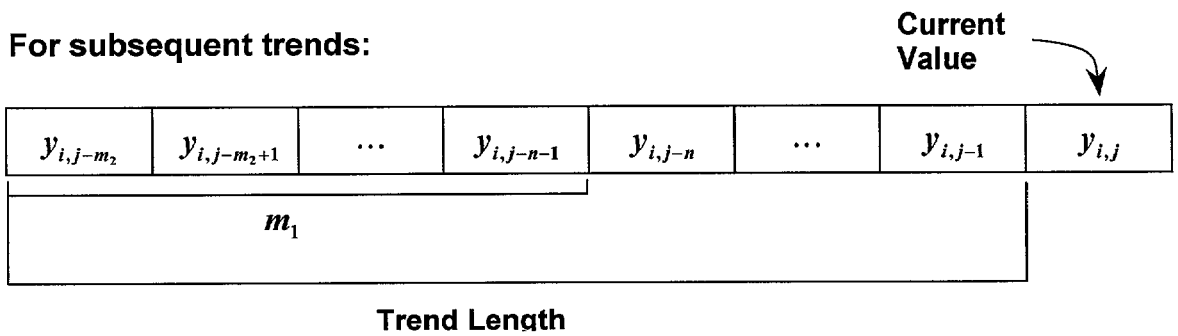
Trend Length
Figure 4b Parameters were extracted from the data between January 1, 1994 and January 1, 1999

US 7,818,224 B2

METHOD AND SYSTEM TO IDENTIFY DISCRETE TRENDS IN TIME SERIES

FIELD OF INVENTION

The present invention relates to a computer-implemented system and method to process one or more time-series signals into representative piece-wise discrete trends. Applications include processing prices from financial data such as stocks, options, futures, commodities, currencies, indices, foreign government and municipal securities, bonds, treasury bills, foreign exchange rates, and interest rates; identifying features on a digital electrocardiogram (EKG) output such as anomalous trend lengths, amplitudes, shapes, or coefficients indicative of a problem with the patient; and identifying features from digital signals measured from machinery to investigate and identify problems with the machinery.

SUMMARY OF PRIOR ART

The prior art includes computational procedures for filtering noisy data. Kostelich and Yorke considered the motion of points around a phase space attractor. (Kostelich, Eric. J. and James A. Yorke, 1990, "Noise reduction: finding the simplest dynamical system consistent with the data", *Physica D* v. 41, pp. 183-196.) They described a method called time delay embedding method to filter noise in chaotic experimental data whose dynamics are low dimensional. In their method, they created a series of vectors of m-dimensional points that are separated by a constant time delay (I.e. if m=3, $x_i=(s_i,s_{i+\tau},s_{i+2\tau})$). A linear approximation of the vectors $(x_i,x_{i+\delta},x_{i+2\delta},\Lambda)$ separated by a distance δ would make it possible to calculate a linear approximation to the dynamics in the neighborhood of $x_i$. Abarbanel suggested that instead of using strictly linear mappings in the neighborhood of $x_i$, the process could be generalized to include polynomial mappings. (Abarbanel, Henry D. I., Reggie Brown, John J. Sidorowich and Lev Sh. Tsimring, 1993, "The analysis of observed chaotic data in physical systems", *Rev. Mod. Phys.*, v. 65, no. 4, October 1993, pp. 1331-1993.)

U.S. Pat. No. 5,537,368 issued Jul. 16, 1996 to O'Brien Jr. et al., considered the problem of detecting signals from an underwater target. They derived a signal processing system consisting of a series of Kalman filters in parallel to process an incoming signal. Each of the Kalman filters fit a polynomial trend of order i (i=0, 1, 2, . . . ) to a data stream. The coefficients of the polynomial, the data stream, and fit values representing the degree of fit of the polynomial to the data stream were exported to a target motion system to determine the velocity and position of a target.

U.S. Pat. No. 5,956,702 issued Sep. 21, 1999 to Matsuoka and Golea, noted the problems with using a Kalman filter to process discontinuous changes in the time series trend, and taught a neural network to estimate a discontinuously changing time series trend. Wolberg discussed using non-linear kernel regression to estimate prices at in the future. (Wolberg, John R., *Expert Trading Systems: Modeling Financial Markets with Kernel Regression*, John Wiley & Sons, Inc., New York, 2000.)

The regressions are performed over a window that can either move or stay fixed as new points are added. He introduced the concept of a "growing option", where the values of new points are included in the regression for predicting the next point. After each point is predicted, it is then included in the prediction of the next point. Wolberg did not discuss discontinuities in the regressions, but did point out that regression models that are created in one period of time may not be useful in the future.

SUMMARY OF THE INVENTION

An embodiment of this invention relates to processing discrete financial time series signals such as stock prices, options prices, futures prices, commodities prices, currency exchange rates, economic and financial indices, foreign government and municipal security prices, bond prices, treasury bill prices, foreign exchange rates, and interest rates. The invention is not restricted to financial applications. In this application, the term "time series" refers to both its literal definition of a string of values, representative of some process continuing through time, each separated by a constant time interval, dt; and a vector of numbers separated by a constant interval or a pair of vectors where one of the vectors contains the location of the data elements in the second vector. In this application, the elements of a time series may be single data points or sets of data points. The vectors data elements don't necessarily have to be equally spaced. For example, a pair of vectors could include the land elevations and locations of those elevations along a trajectory that extends from Dallas to San Francisco.

Over a period of time, these types of time series exhibit fluctuations, which can be characterized by a plurality of discrete "trends", where each trend represents a sequence of data elements when the data is generally increasing or decreasing at a certain linear or non-linear rate. Typically the data is "noisy" in that the data points may each deviate from the values defined by the trend. Typically, these trends do not last indefinitely, and it is of great interest to financial managers and others to determine when a trend has ended.

The current invention addresses the analysis of time series data in a manner that provides useful information about the trends for a particular data set and how accurately those trends track the actual data. The method is based on the observation that while many different sets of discrete trends can be computed for a particular data set, a few of those trend sets are much better at tracking subsequent data than others. In general, the method produces a relatively large number of discrete trend sets for a particular data set; evaluates the relative effectiveness of how well each set tracks the time series over which it was tested, and selects a few of those trend sets that are most effective in that tracking. The method then employs those more effective trend sets to evaluate subsequent data.

In one embodiment a particular set or vector of time series data may be input to a processor for analysis.

In an alternative embodiment, the processor may access and analyze multiple sets of time series data to determine one or more sets which meet a selection criteria. Typically this selection criteria is related to relatively strong "trending" over a period of time, and the detection can often be made by a simple first-order, linear regression fit to the data. In that case, frequently the time series datasets that have regressions with larger slopes and higher correlations with the time series garner more interest.

The selected time series is fed into the processor to derive the optimum parameters for processing the time series. A subset of the time series is used as a "training" set. Inherent in deriving the parameters is the actual processing of the time series into discrete trends. One goal is to find the parameters that minimize the error between the time series and trend values, while maximizing the average length of the trends. Another goal is to find the trends that generate the greatest return from the beginning to the end of the trend. The two goals are not necessarily the same.

Once the parameters have been selected, they are applied to the time series. In this step, an initial window size ($m_1$) data values are selected from the beginning of the time series. In the preferred embodiment, a polynomial curve, representing the trend, is fit through these data values. Each subsequent data value in the series is then added, and the trend is recalculated. A trend is determined to have ended when either: a) the last data value added to the trend exceeds a standard deviations limit, $L_s$, of normalized deviations from the trend in the direction opposite to that of the trend; or b) the trend direction or derivative changes from positive to negative or vice versa. The last data value that was not part of the last trend becomes the first data value in the new trend. In trends after the first trend, the last $m_1$ data values from the previous trend are used in addition to the n points from the new trend to fit the trend curve.

Once the trends have been identified, the trends, the original time series, and other results are exported for further optional processing and to calculate values such as the average length of the trends, the beginning and ending times and/or dates, the beginning and ending data values, and the average of the first derivatives of the trends.

In applying this tool to multiple financial time series, such as stock prices and interest rate indices, it is apparent that the optimum trend determination parameters and the resulting trends differ from stock to stock. Some stocks are strongly trending, while others display other recognizable characteristics. Some stocks seem to display no apparent patterns after processing with this tool with the options available at this time. This tool has the ability to extract patterns from some seemingly random time series. While the patterns aren't deterministic, there seems to be a character or "personality" in regards to the length and shape of the patterns for many of the stocks processed so far. The trends resulting from different sets of trend determination parameters for a given model illustrate different aspects of that "personality".

Specific trends either move up or down or are flat. These different trends identify different "states" of the process. It is reasonable to assume that within a trend that some mathematical methods of prediction or trading might be realized, and that a method of prediction or trading would not necessarily work once the trend had ended. Certain trading systems might work within a flat trend might not work for a trend moving up or down.

While individual models, each based on a single set of trend determination parameters, may do moderately well in defining when trends begin and end, better models may be achieved by combining the trends from different models to produce a composite model. For example, frequently after a single trend has ended, several very short trends will follow. Some of the trend algorithms described in this application do not do perform well while prices are oscillating within a lateral range. They will produce numerous short trends in these models, which would not be wise to trade. Therefore, several models could be combined so that once a trend ended; the next trend that would be selected would be one that had the most data elements lasted the longest up to that point.

The methods described in this application only take into account the previous values of a time series or vector to evaluate a new data element to determine whether it is within a trend or not. These methods can be improved to include other information that might affect the prices of a security, including other financial information. A method of doing this is an extension of the regressions described in this application and is multiple regression with additional independent variables.

One of the outputs of this process is a set of normalized deviations from the dynamic trend. This time series oscillates between positive and negative values and could be used with thresholds as a trading indicator.

If this method is able to extract a deterministic component of price movement from securities that can be modeled and simulated, then this has ramifications in regards to not only being able to make predictions about the future value of security prices, or to define different "states" in which to trade, but also to how options are priced.

BRIEF DESCRIPTION OF THE DRAWINGS

The above-mentioned and other objects and features of the present invention will become apparent from a reading of the following detailed description with reference to the accompanying drawings, in which:

FIG. 4B is a diagram of the time series and the window length parameters that are used to filter the time series for the first and subsequent trends.

DETAILED DESCRIPTION OF EMBODIMENT

Selecting a Time Series Data Set

Figure 1:
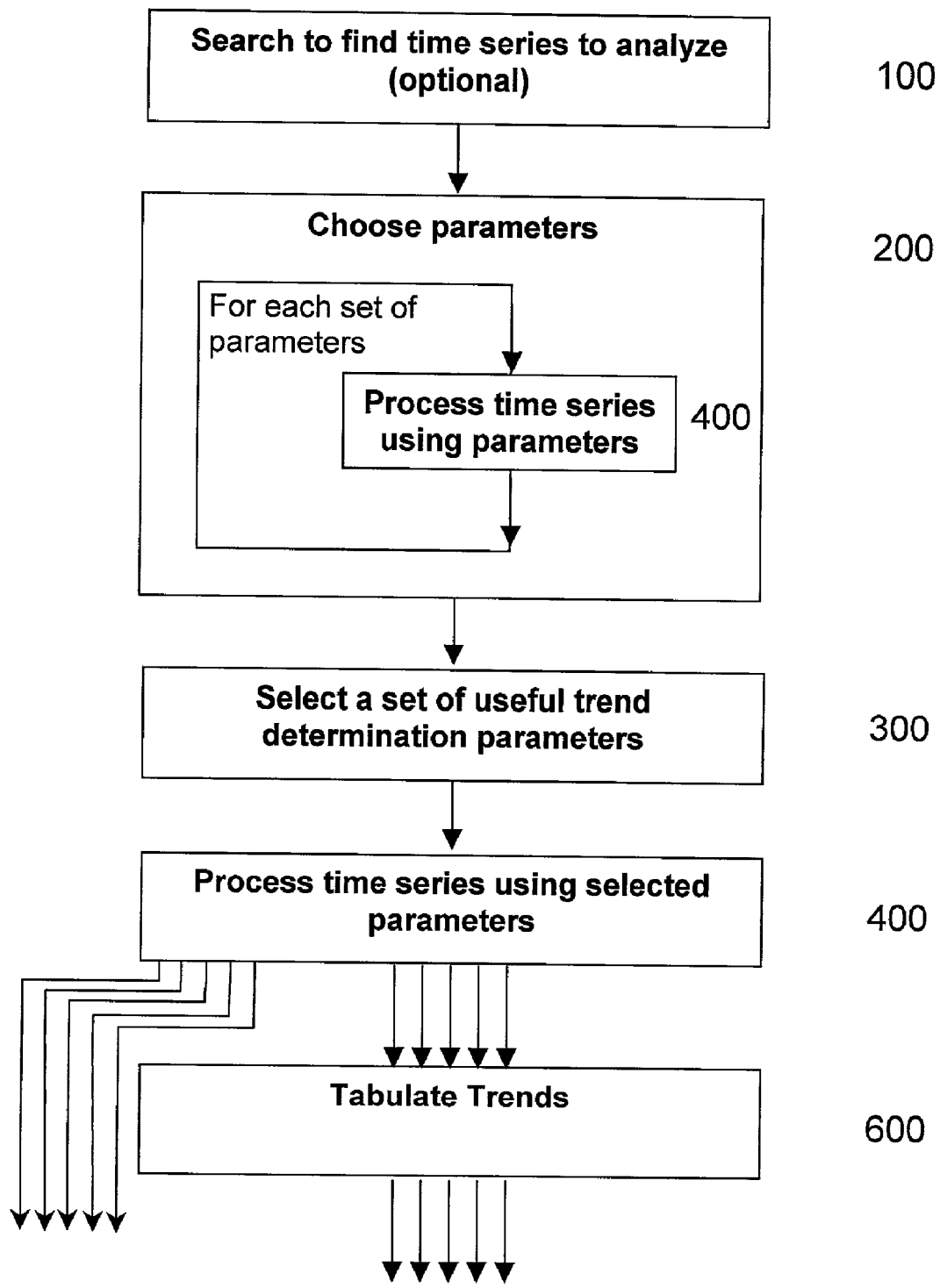
FIG. 1 is a flowchart of the major analysis steps.

In this embodiment, a plurality of time series data sets is analyzed in order to identify one or more data sets for further analysis. Referring now to FIG. 1, which is a flowchart of the major analysis steps, in step 100 each of the data sets is analyzed to determine if the set is strongly trending. For each set, the last $M_1$ data elements are extracted from the time series, and a line is fit through the points using multiple regression. In this example, $M_1$ is selected to be about 30 data points, or approximately 1.5 months of data. The normalized slopes and correlation coefficients are recorded. Upon such analysis of each of the data sets, a data set is selected for further analysis. When identifying financial instruments to trade, a time series that has a large increase or decrease in normalized slope with a correspondingly large absolute value of the correlation coefficient would be a likely candidate for subsequent processing. Time series data sets that have a small slope would generally be avoided.

Figure 2:
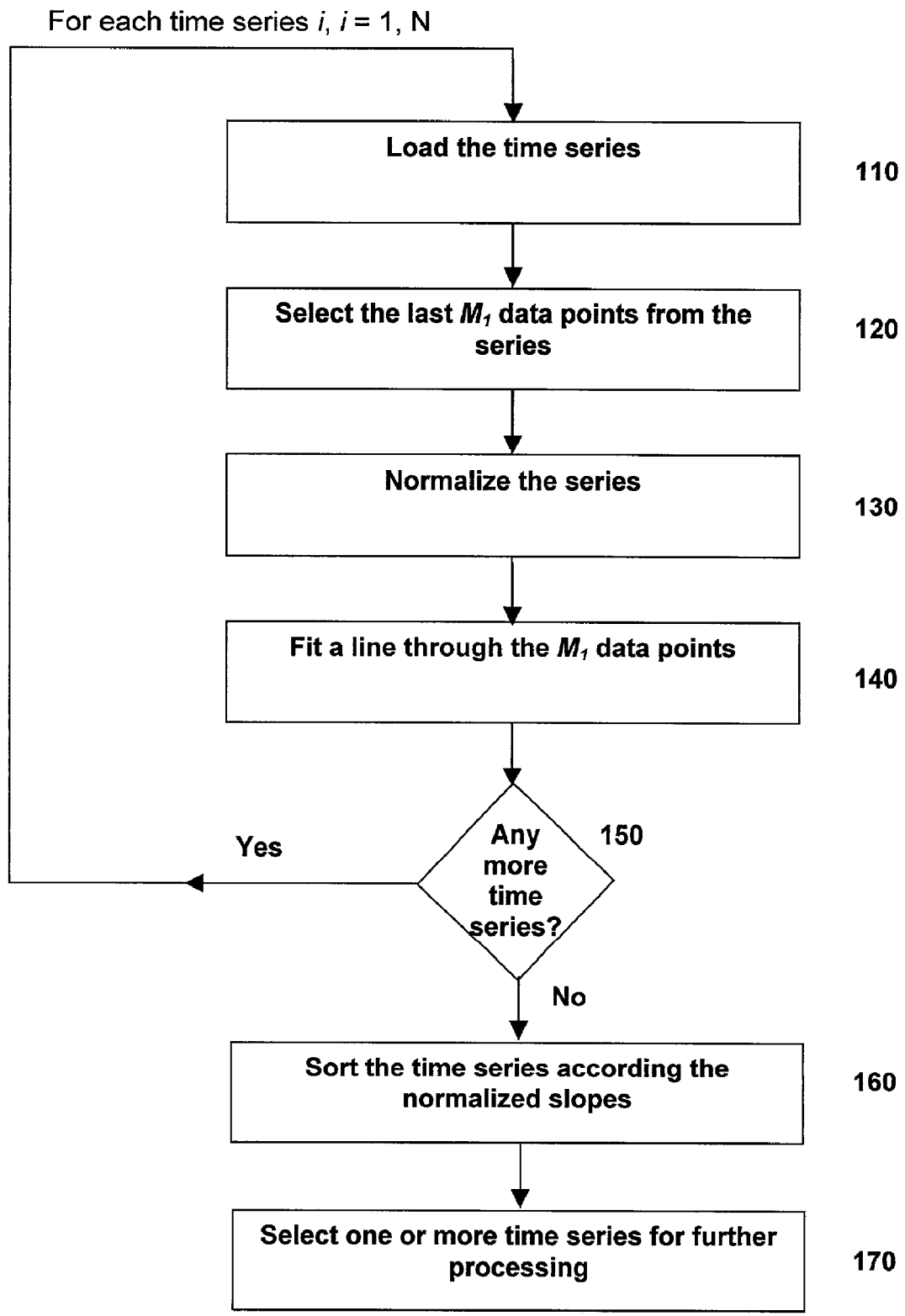
FIG. 2 is a detailed flowchart of the time series data set selection steps.

Referring now to FIG. 2, which is a more detailed flowchart of the data set selection steps, the initial search is performed through the following steps for each time series data set i:

In step 110, each time series data set, $y_{1,j}$, $j=1, N_1$, where $N_1$ is the number of elements in time series, is loaded into the processor. Note that a mathematical transform of a time series is also a time series (i.e. $y_{i,j}'' = \ln(y_{i,j})$, $j=1, N_i$ is also considered to be a time series).

In step 120, an initial window size $M_1$, is read by the processor, and the last $M_1$ data points from the time series, $y_{i,j} = y_{i,N_1-M_1+j}$, $j=1, M_1$, are selected.

In step 130, the series of the last $M_1$ data points is normalized by dividing each data point by $y_{i,1}$, so that the first data value is 1.0. The normalized time series is designated as y', where $y'_{i,1} = 1.0$. The normalization is performed in order to permit sorting of the data sets on a consistent basis, such as the slope of a line fit through the last $M_1$ data points. Alternate methods of normalization may be used such as: a) dividing the time series its mean or median; b) ranking the values in the time series and using the ranks instead of the time series values themselves in the regression; or c) calculate the Fourier transform of the time series, zero the zero-th frequency contribution, and back-transform the series back to the time domain.

In step 140, a line, $y'_{i,j} = a'_i x_{i,j} + b'_i$, is fit through the $M_1$ data points $(x_{i,j}, y'_{i,j})$ $j=1, M_1$, $x_{i,j} = j$ using linear regression. The slope of the line, $a'_i$, is stored on the processor so that it may be used as a time series data set selection criterion. Alternate methods of data fitting may be used such as higher order polynomial regression or nonlinear regression. In this embodiment, the average of the first derivatives would be stored on the processor as $a'_i$.

In step 150, if there are remaining time series data sets, steps 110-140 are repeated. After each data set has been analyzed in steps 110-140, the results are reviewed in step 160. In this embodiment, the time series data sets are sorted according to the normalized slopes; a time series data set is selected for further processing and loaded in the processor in step 170.

Alternate methods of data set selection may be used such as analyzing both the trend and positive or negative fundamental information. For example, a stock that has both an increasing trend, and a low price to earnings ratio may be a more desirable candidate than an overpriced stock whose trend is just as strong. Similarly overpriced stocks may become good candidates for selling short once they start trending down.

Generating the Trend Determination Parameters

Referring again to FIG. 1, once a time series data set has been selected and loaded in the processor, the trend determination parameters are selected at step 200. Inherent in this step is a processing of a portion of the time series to derive the parameters. The Initial Window Size ($m_1$) is the size of the first window that is the minimum number of data points needed to define a trend. The Deviation Limit ($L_s$) is the number of deviations away from the trend that the next day's closing price or additional data value must be to signal a new trend. The deviations are defined as a measure of the spread of a distribution. Common statistical measures of spread of a distribution are variance, standard deviation, inter-quartile range, and range between the minimum and maximum values. In this invention, $L_s$ refers to any and all measures of spread of a sample of values.

Each set of trend determination parameters in combination with the particular data fitting procedure, such as polynomial regression, produces a unique set of trends for a time series data set. At this step of the method, many different sets of trend determination parameters preferably are used to produce corresponding sets of trends. These multiple sets of trends are then evaluated to determine which of the sets are better at matching the current data from the time series data set.

The trend determination parameters can be selected in several ways. In this embodiment, a subset of the time series, the first $M_2$ data points of the time series (where $N_i$ is the number of data points in the entire time series data set under evaluation) are selected for defining the trend determination parameters. However, the time series is not limited to this embodiment, and trend determination parameters can be derived from any time series or one or more simulations of time series. In this embodiment, the parameter selection is manual so as to allow the selection of more than one set of parameters to generate multiple optimum trends with different trend lengths for a given time series as will be discussed in FIG. 6.

Figure 3:
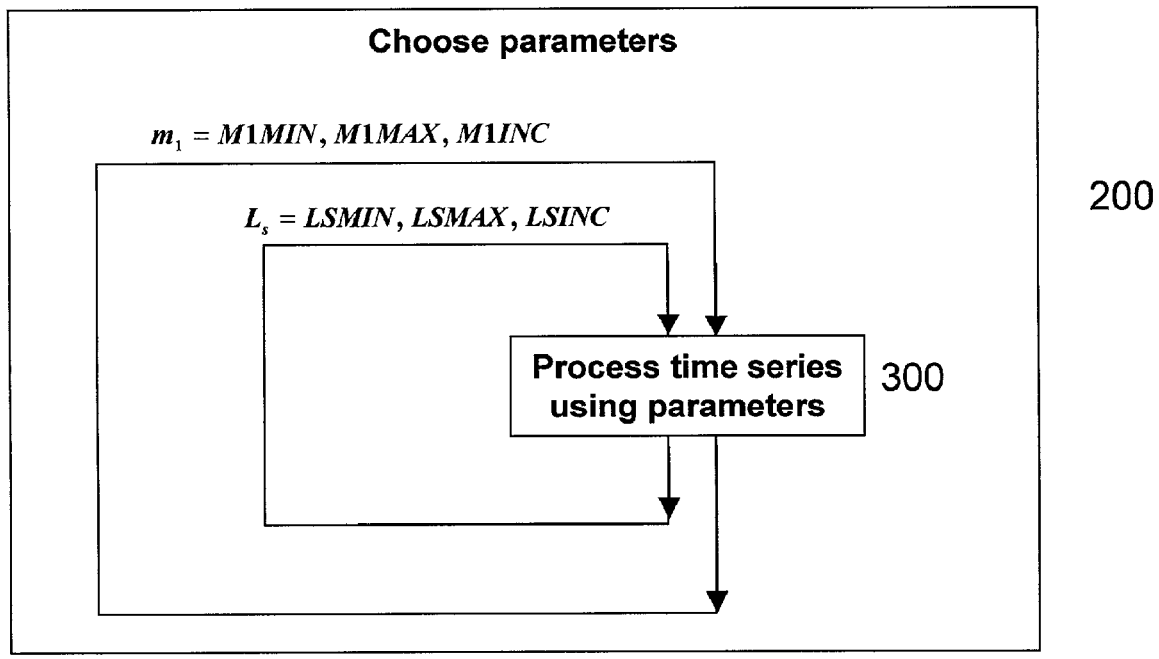
FIG. 3 is a detailed flowchart of the procedure for deriving the trend determination parameters.

Referring now to FIG. 3, which is a detailed flowchart of the procedure for deriving the trend determination parameters. A set of trend determination parameters is generated in step 200 by looping in increments between minimum and maximum values for each of the trend determination parameters. In this embodiment, two trend determination parameters are used—the Initial Window Size ($m_1$) which is evaluated between a starting value M1MIN and an ending value M1MAX in an increment M1INC; and Deviation Limit ($L_s$) which is evaluated between a starting value LSMIN and an ending value LSMAX in an increment LSINC. Typical values for these variables are:

M1MIN=3
M1MAX=70
M1INC=1
LSMIN=1
LSMAX=20
LSINC=0.5

The trend determination minimum, maximum, and increment parameters are determined through experience. If either of the selected trend determination parameter values is equal to M1MAX or LSMAX for a selected trend set, then this would indicate the need to increase the LSMAX or M1MAX values. The M1INC and LSINC are selected with a tradeoff between accuracy and time. M1INC cannot be smaller than 1. The smaller the values for the increments, M1INC and LSINC, the longer it takes to process all of the trends. However, with smaller increments, there is an increased likelihood of obtaining trend parameters that produce more accurate trends. The lower bound Initial Window Size, M1MIN, is limited by the order of the polynomial that one is using for the trend. For a linear trend (a line) one needs at least two points to fit a line. For second-order polynomials, one needs three points to fit a curve to the data points.

In step 200, these values are generated in a nested loop resulting in approximately 2,500 sets of trend parameters. Referring again to FIG. 1, it is usually desirable to process these sets in step 400 as the values are generated. For each parameter set, the following values are calculated and exported:

- the number of trends in the subset of the time series ($N_{Trends}$);
- the RMS Error between the input data values and trend values;
- the average length of the trends;
- the average trend length/$m_1$, where $m_1$ is the minimum number of data points needed to define a trend;
- the average return (%) of the trends;
- the cumulative return (%) of the trends;
- the fraction of correct predictions, where the initial trend was increasing and the ending price was higher than the initial price, or the initial trend was decreasing and the ending price was lower than the initial price at the beginning of the trend;
- the fraction of incorrect predictions, where the initial trend was increasing and the last price was lower than the initial price, or the initial trend was decreasing and the last price was higher than the initial price;
- the RMS Error/(Average length of the trends/$m_1$); and and the RMS error *$L_s$
- the efficiency of the trends (%), where efficiency is defined as the average return of the trends (%)/average length of the trends;
- compounded return of the trends (%)

Each of these values is stored in the computer with its corresponding set of trend determination parameters ($m_1$ and $L_s$).

Selecting a Set of Useful Trend Determination Parameters

Referring again to FIG. 1, at step 300 the values for each of the sets of trend determination parameters are evaluated in order to select one or more useful set of trend determination parameters for a particular time series data set. This step is based on the unexpected observation that trends, based on a given set of determination parameters, that fit one portion of the time series well also tend consistently to fit subsequent portions of the time series as well.

Figure 6:
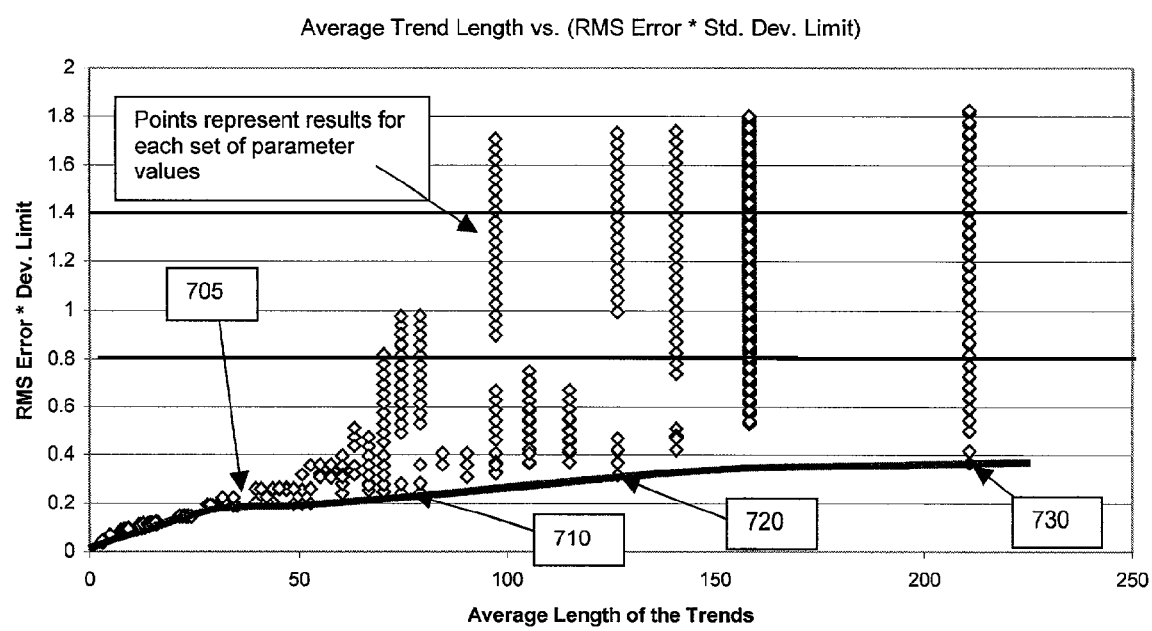
FIG. 6 is a representative plot of the product of the root mean square (RMS) error and the deviation limit, $L_s$, versus the average trend length for a time series data set with multiple trend determination parameters.
Figure 7:
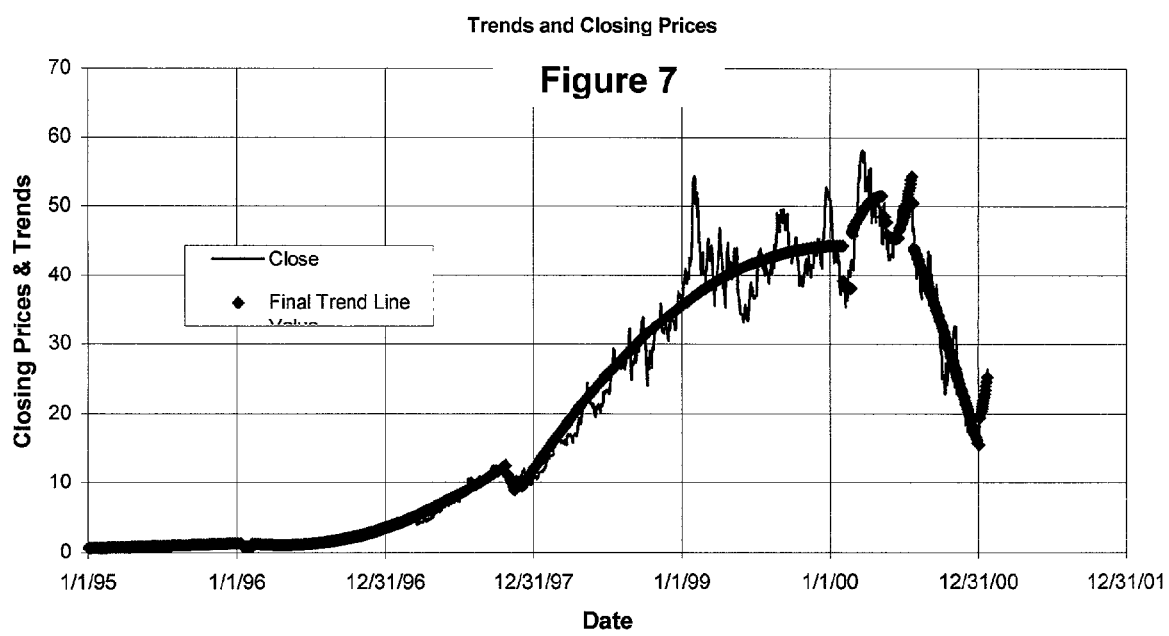
FIG. 7 is an example of a trend set fit to the closing stock prices for DELL Computer Corporation. The data that were used to select the trend parameters was from Jan. 1, 1994 to Jan. 1, 1999. The selected trend parameters were then applied to the data from Jan. 1, 1994 through Jan. 23, 2001.

In a semi-automated method of this embodiment, the RMS error is crossplotted against the average trend length and a subset of the more effective parameter sets are identified from that plot. Referring now to FIG. 6, which is a plot of the product of the RMS error and the deviation limit, $L_s$, versus the average trend length, the lower line 705 represents a fit of a curve through the trend determination parameter sets that have long trends and low error. The points along or near this curve represent the optimum combination of low error and longer trends for the time series data set. The points that are closest to that line, particularly those points corresponding to longer average trends such as points 710, 720, and 730, are considered to be the most desirable for subsequent analysis of the time series data. In this embodiment, several values that have the maximum "Average Trend Length" for a minimum "RMS error * $L_s$" are selected. More than one set of trend parameters is selected so that multiple trends can be generated. Generally two to three sets are selected for subsequent analysis, though other users may have different uses for the tool and may select more or less depending upon their purposes. Each trend picks up different features, and the trend produced by one set of trend parameters may be more useful during one period of time versus the trend produced by another set of trend parameters.

In other embodiments, other types of error measures such as other $\lambda_p$ norms, where p is a real number, may be used. For example, the $\lambda_1$ norm is very commonly used for robust estimation in problems that have large outliers (Tarantola, Albert, *Inverse Problem Theory: Methods for Data Fitting and Model Parameter Estimation* Elsevier, N.Y., 1998.). There are numerous other measures of error that can be employed based on probability distributions and are not limited to $\lambda_p$ norms. These include those based on a Lorentzian distribution, Andrew's sinc, and Tukey's biweight (Press, William H., Brian P. Flannery, Saul A. Teukolsky, and William T. Vetterling, *Numberical Recipes in C: The Art of Scientific Computing*, Cambridge University Press, 1989.). In some embodiments, this semi-automated step of visual examination of the results can be replaced by an automation of the process by establishing one or more objective functions. In the case of this type of automation, there are numerous, well-known optimization techniques that may be employed to find good parameter sets without the exhaustive generation of parameter sets described in the section above.

Processing the Time Series with Trend Determination Parameter Sets

Referring again to FIG. 1, when one or more trend determination parameter sets are selected, they are applied to process the time series and to generate the trends at step 400. The result of this step is a set of trends for each trend determination parameter set as each new data point is considered for the time series.

Figure 4A:
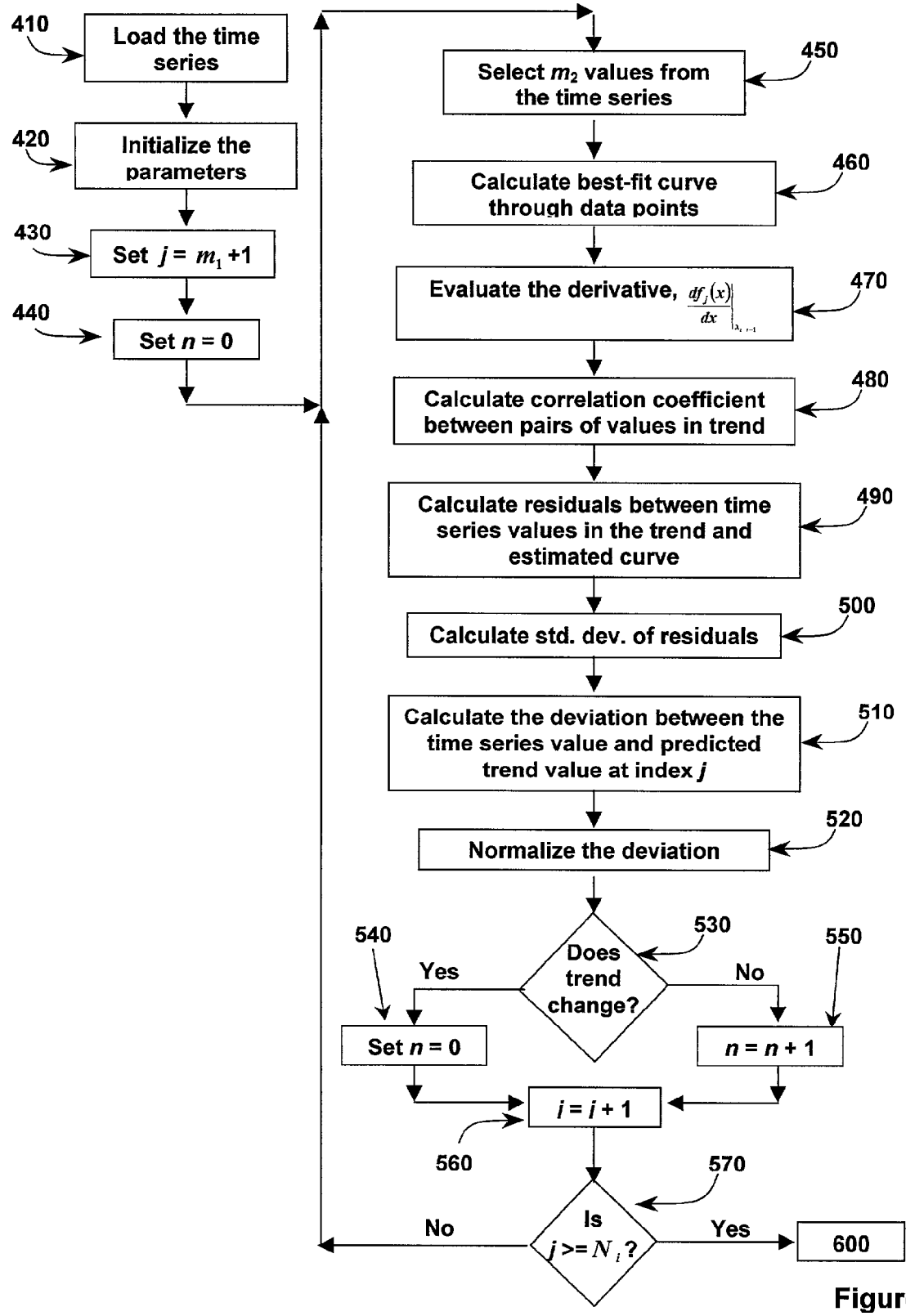
FIG. 4A is a detailed flowchart of the procedure for processing a time series to derive the trends.

FIG. 4A is a detailed flowchart of the processing of a time series at step 400 for determining whether or not a new data point represents a continuation of a trend. For each selected trend determination parameter set ($m_1$, $L_s$), the latest trend is updated with each new sequential value of data for the time series data set. In this embodiment, a trend is described by a best-fit polynomial curve through all of the data within the trend and some number of data values from the previous trend. As a consequence, the current trend is dynamic and will be updated as each value of new data arrives. Once the trend changes, the previous trends are no longer dynamic.

A new trend is defined to have begun when one of the following occurs:

- The derivative of the trend changes from positive to negative or vice versa; or
- The number of deviations that the difference between the last closing price or sequential data element and the predicted trend value meets or exceeds $L_s$, the deviation limit, and the deviation is in the opposite direction to that of the trend. If the difference meets or exceeds $L_s$, but the deviation is in the same direction as that of the trend, then the trend is maintained. The reason for this is to maintain longer trends. There is less confidence in shorter trends. In some applications, such as financial management, the determination that new time series data is consistent with a longer upward or downward trend is more important than whether the magnitude of that trend has changed. In other applications, it is more important that the data be fitted better by a new trend, so the trend wouldn't be maintained.

Referring to FIGS. 4A and 4B, the processing is accomplished through the following steps:

- In step 410, load the time series, $y_{i,j}$, j=1, $N_1$, where $N_1$ is the number of elements in time series i.
- Initialize the trend determination parameters in step 420. The trend determination parameters are $m_1$, the first window size; $L_s$, the deviation limit; and $m_2$, the second window size. The first window size is the minimum number of data points needed to define a trend. In this embodiment, the deviation limit is the number of deviations away from the trend that the next day's closing price or additional data value must be to signal a new trend. The deviations are defined as a measure of the spread of a distribution. Common statistical measures of spread of a distribution are variance, standard deviation, inter-quartile range, and range between the minimum and maximum values. In this patent application, $L_s$ refers to any measure of spread of a sample of values. In this embodiment, the second window size is equal to $m_1$ for the first iteration, and is equal to $n+m_1$ for subsequent iterations where n is the length of a trend. This is the number of data values at the end of the trend's time series that are used to calculate a test measure of spread.

Set j, the time series index, to $m_1+1$ in step 430.

Set n, the number of points in the current trend to 0 in step 440.

For each trend, check to see if the current value, $y_{1,j}$, is in the trend in steps 450-530.

For the First Trend

In step 450, select_$m_1$ values from the beginning of the segment of interest in the time series.

In step 460, calculate a best-fit curve $f_j(x)$, through the $m_2$ data points. $(x_{1,k}, y_{1,k})$, $x_{1,k}=[k-(j-m_2)+1]$, $k=(j-m_2)$, j–1. The subscript j in $f_j(x)$ refers to the function estimate at index j, when evaluating whether $y_{1,j}$ is in the trend or not. In the preferred implementation, least squares regression is used to determine a best-fit polynomial through the data points. However, the curve in this patent application is not restricted to a polynomial function nor to a polynomial function of any particular order. The curve can be another mathematical function, such as an exponential or logarithmic function. It could also be the estimate derived from a neural network or Kalman filter. Least squares regression ($\lambda_2$ norm) is the preferred method used to calculate the curve, $f_j(x)$, but this is not restricted to a $\lambda_2$ norm. The invention is patent application includes other methods that can be used to determine the fit of a curve to a set of points. This includes other $\lambda_p$ norms, where p is a real number.

In step 470, evaluate the derivative $$\frac{d f_j(x)}{dx} \bigg|_{x_{i,j-i}}$$

at the point $x_{i,j-1}=m_2$ and obtain an estimated value of the curve, $f_j(x_{i,j})$ at index j. Note that the derivative is also calculated at index j, where $x_{i,j}=m_2+1$.

In step 480, calculate the correlation coefficient (R) between the pairs of values, $(y_{i,k}, f_j(x_{i,k}))$, $k=(j-m_2)$, j–1. The correlation coefficient is not critical to the process, but it is useful diagnostic information that is output for further analysis.

Calculate the residuals, $d_k$, between the time series values, $y_{1,j}$, and the trend values, $f_j(x_{1,j})$ in step 490. Although it is unnecessary in most cases, it is sometimes desirable to normalize the residuals, such as by dividing by the trend values. The purpose of this normalization is to ensure homoscedasticity of the deviations. If the series is trending up or down within a single trend, then the non-normalized deviations at the beginning of the trend will have a different variance than the non-normalized deviations at the end of the trend. Alternatively, other methods of normalization may be employed, such as dividing by a moving average of the trend.

$$d_k = \left[\frac{(y_{i,k} - f_j(x_{i,k}))}{f_j(x_{i,k})}\right], k = (j - m_2), j - 1 \quad (1)$$

Calculate the standard deviation, $s_{j-1}$, of the residuals, $d_k$ in step 500. The standard deviation is used in this embodiment; however, it is only one of many measures of the spread of a distribution. The invention includes other measures of spread, such as the variance, range, inter-quartile range, root mean square, differences between any quantiles of a distribution, or a measure of spread from a neural network.

Calculate the deviation between the predicted trend value and the actual value, $y_{i,j}$ at $x_{i,j}$ in step 510. The invention includes either normalizing by dividing by the trend value, $f_j(x_{i,j})$, or not normalizing. Other methods of normalization may be employed, such as dividing by a moving average of the trend.

$$d_j = \left[\frac{(y_{i,j} - f_j(x_{i,j}))}{f_j(x_{i,j})}\right] \quad (2)$$

Normalize the deviation, $d_j$ in step 520.

$$d'_j = \frac{d_j}{s_{j-1}} \quad (3)$$

Test to determine whether the trend has changed at step 530. In this embodiment, the trend changes if the sign of the first derivative, $d_j$, has changed from the previous iteration to the current iteration (equation 4):

$$\text{If } \left\{sign\left[\frac{d f_j(x)}{dx}\bigg|_{x_{i,j-1}}\right] \neq sign\left[\frac{d f_{j-1}(x)}{dx}\bigg|_{x_{i,j-2}}\right]\right\}, \text{ then true} \quad (4)$$

The trend also changes if the normalized deviation, $d'_j$, exceeds $L_s$ in the opposite direction to that which the trend is going. In an alternate embodiment, the trend may be determined to have changed if only the absolute value of the normalized deviation exceeds the deviation limit.

$$\text{If } \left\{\begin{array}{l}[abs(d'_j) > L_s] \text{ AND} \\ \left\{\left[\left(\frac{d f_j(x)}{dx}\bigg|_{x_{i,j}} > 0\right) \text{ AND } (d'_j < 0)\right] \text{ OR} \\ \left[\left(\frac{d f_j(x)}{dx}\bigg|_{x_{i,j}} < 0\right) \text{ AND } (d'_j > 0)\right]\right\}\end{array}\right\}, \text{ then true} \quad (5)$$

If the trend does not change at step 530, then increment n to n+1 at step 550.

If the trend does change at step 530, then set n=0 at step 540.

Increment j at step 560.

At step 570, if $j<N_t$, then repeat steps 450-560 for the next data point in the data set. If the last point of the time series is still within the first trend, then go to step 600 and calculate trend attributes.

For Subsequent Trends
  Select $m_2$ values at step 450. $m_1$ of the values are from the end of the previous trend, and n values are from the current trend. Calculate the best-fit curve, $f_j(x)$, through the $m_2$ data points at step 460.
In step 470, evaluate the derivative $$\left. \frac{df_j(x)}{dx} \right|_{x_{i,j-i}}$$

at the point $x_{i,j-1}=m_2$ and obtain an estimated value of the curve, $f_j(x_{i,j})$ at index j. The derivative may also be calculated at index j, where $x_{i,j}=m_2+1$.
  In step 480, calculate the correlation coefficient (R) between the pairs of values, $[y_{i,k}, f_j(x_{i,k})]$, $k=(j-m_2), j-1$.
  Calculate the residuals, $d_k$, between the time series values, $y_{i,j}$, and the trend values, $f_j(x_{i,j})$ in step 490. Optionally, the residuals may be normalized as described above.
  Calculate the standard deviation, $s_{j-1}$, of the residuals, $d_k$ in step 500.
  Calculate the deviation between the predicted trend value at step 510, as described previously.
  Normalize the deviation at step 520, as described previously. Test to determine whether the trend has changed. 530, as described previously. If the trend changes then set n=0 at step 540. If the trend doesn't change, then increment n at step 550. Increment j at step 560.
  At step 570, if $j<N_i$, then repeat steps 450-560 for the next data point in the data set. If the last point of the time series has been reached ($j \geq N_i$), then go to step 600 and calculate trend attributes.

Figure 5:
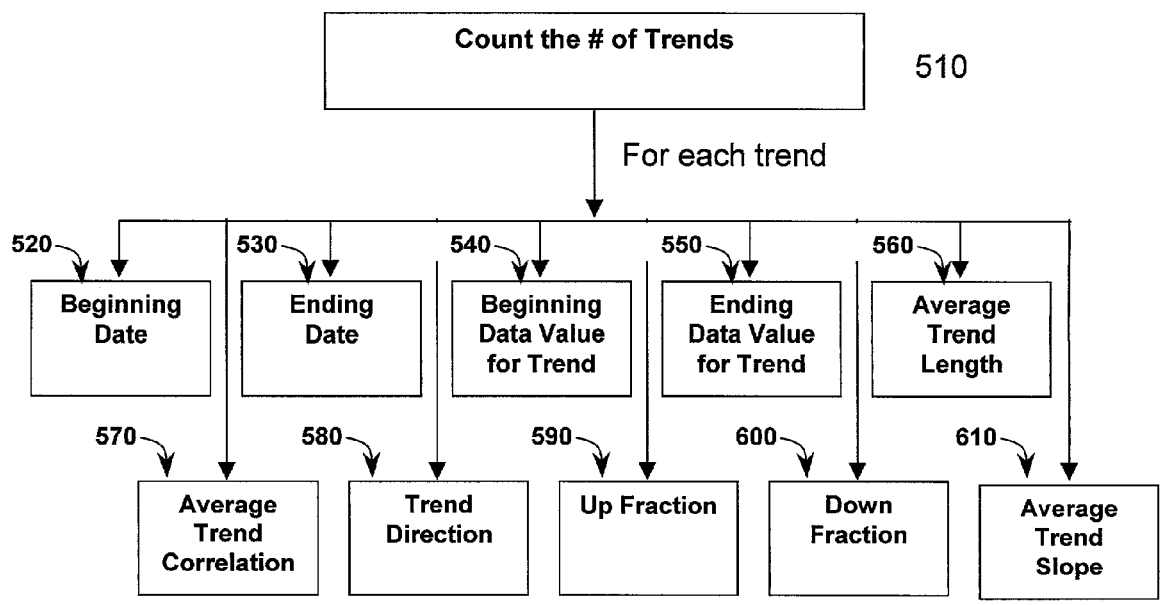
FIG. 5 is a chart describing the post-processing of the time series trends.

The procedure preferably outputs the following arrays for each trend parameter set. There are $N_i$ elements in each array. They can either be analyzed by themselves or output to a post-processing procedure to calculate statistics on the trends as shown in FIG. 5.
  Date or index array
  Data array $(y_{i,j})$, j=1, $N_i$.
  Data value change=$\ln(y_{i,j}/y_{i,j-1})$, j=1,$N_i$
  Trend codes array
  d', the array of normalized deviations from the trend.
  Array of minimum closing prices allowed based on trend
  Array of maximum closing prices allowed based on trend
  Array of the first derivatives of the dynamic trend
  Array of the first derivatives of the normalized dynamic trend. The data values at the beginning of the trends are normalized to one, so that the initial trend data value is one for all trends. The derivative of the trend fit to the normalized data values can be compared to the derivatives of the other trends for filtering purposes. Alternate methods of normalization may be used as described previously. This can include: a) dividing the time series values in the trend by its mean or median; b) ranking the values in the trend and using the ranks instead of the time series values themselves in the regression; or c) calculate the Fourier transform of the time series values in the trend, zero the zero-th frequency contribution, and back-transform the series back to the time domain.
  Array of the first derivatives of the final trend.
  Array of correlation coefficients (R) of the final trend line through the data values for each index i.
  The array of final trend line values once a trend has been finalized.
  An array of the differences between the data values and the trend values.

FIG. 6 represents trends fit to a time series. The data that were used to select the trend parameters are the closing prices of Dell Computer Corporation from Jan. 1, 1994 through Jan. 1, 1999. The parameters were then applied to the closing prices from Jan. 1, 1994 through Jan. 23, 2001.

Determining Attributes of Each Trend

Referring again to FIG. 1, after determining whether a new point represents the continuation of a current trend, a number of attributes of each of the trends are calculated or updated in step 600. For each of the set of trend determination parameters, each trend is characterized.

Referring now to FIG. 5, which is a post-processing chart for the trends of a time series, the trends are counted in step 610, and statistics for each of the trends are calculated in steps 610-710. The statistics include:
  Determining the beginning date or index for each trend at step 620;
  Determining the ending date or index for each trend at step 630;
  Determining the beginning data value in each trend at step 640;
  Determining the ending data value in each trend at step 650;
  Determining the trend length at step 660;
  Determining the average trend correlation at step 670;
  Setting a flag at step 680 to indicate the direction of the trend, where up=+1, flat=0, and down=−1;
  Determining the fraction of changes in data values that were increasing relative to the previous data value for each trend at step 690;
  Determining the fraction of changes in data values that were decreasing relative to the previous data value for each trend at step 700; and
  Determining the average slopes or first derivatives of each trend at step 710.

In this embodiment, a series of arrays is output, each containing $N_{Trends}$ elements, where $N_{Trends}$ is the number of trends derived from the time series.

Implications of the End of a Trend

One of the uses of this invention is to provide an unbiased method for assessing whether the fluctuations in the prices of a financial instrument are normal fluctuations around a trend, or whether they are indicative of a change in the trend itself. In the first case, negative deviations from the trend provide buying opportunities if the trend is positive. In the second case, where the tool would provide an indication that the trend itself is changing; a change in the trend would provides an opportunity to reassess the potential direction of prices for a financial instrument. Other tools, such as the fundamental analysis of a stock's potential could be assessed to determine whether a position in a stock should be changed. For example, assume that a stock is in an uptrend. A downward change in the trend would provide a signal that the trend has changed and that the position needs to be re-evaluated. In another example, if the stock has a positive fundamental position, but the stock is in a downtrend, this tool would be used to assess when the downtrend has ended and signal an opportunity to purchase the stock at an even cheaper price.

DETAILED DESCRIPTION OF ALTERNATE EMBODIMENT

Non-Constant Interval Between the Samples in a Vector

This alternate embodiment relates to steps 200 through 400. It is an alternative method for processing time series datasets with vectors of values that have non-constant spacing between the values. Instead of a time series being represented by $y_{i,j}$, $j=1$, $N_i$, a vector is now represented by $(x_{i,j}, y_{i,j})$, $j=1$, $N_i$ where $x_{i,j}$ represents some measure of the location or time for each sampled data value $y_{i,j}$.

For example, $(x_{i,j}, y_{i,j})$, $j=1$, $N_i$ can represent the times and prices for individual trades that arrive at a non-constant interval of time.

Selecting a Vector Data Set

In this embodiment, as in the first embodiment, a plurality of vector data sets is analyzed in step 100 to identify one or more data sets for further analysis. The difference is that the values in the vector are no longer at a constant spacing. Therefore, the last $M_1$ data elements are no longer applicable, because the last $M_1$ data elements would represent different amounts of time, distance, or other variable that is used to represent the location $x_{i,j}$ of each of the data values $y_{i,j}$. Therefore, instead of using a constant number of last points, it is desirable to use a constant measure of $x_{i,j}$ called $\Delta X$, and a minimum number of points that are necessary to fit the initial curves, $M_{Min}$. The number of points that are in the time span of $\Delta X$ and are greater than $M_{Min}$ will be referred to as $M_i$. A curve will be fit through the data elements $(x_{i,j}, y_{i,j}) = (x_{i,N_i-M_1+j}, Y_{i,N_i-M_1+j})$, $j=1$, $M_i$ using multiple regression.

As in the first embodiment, the normalized derivatives and correlation coefficients are recorded. Upon such analysis of each of the data sets, a data set is selected for further analysis. When identifying financial instruments to trade, a vector that has a large increase or decrease in normalized derivative with a correspondingly large absolute value of the correlation coefficient would be a likely candidate for subsequent processing. Vector data sets that have a small slope would generally be avoided.

Referring now to FIG. 2, which is a more detailed flowchart of the data set selection steps, the initial search is performed through the following steps for each time series data set i:

In step 110, the each vector data set, $(x_{i,j}, y''_{i,j})$, $j=1$, $N_i$, where $N_i$ is the number of elements in vector, is loaded into the processor. Note that a mathematical transform of a vector is also a vector. (i.e. $(x_{i,j}, y''_{i,j}) = (x_{i,j}, \ln(y_{i,j}))$, $j=1, N_i$ is also considered to be a vector).

In step 120, an initial window size $\Delta X$, is read by the processor, and the last $M_i$ data elements, where $M_i \geq M_{Min}$, are selected from the vector data set. $(x_{i,j}, y_{i,j}) = (x_{i,N_i-M_1+j}, y_{i,N_i-M_1+j})$, $j=1$, $M_i$.

In step 130, the series of the last $M_i$ data elements is normalized by dividing each data element by $y_{i,1}$, so that the first data value is 1.0. The normalized vector is designated as y', where $y'_{i,1} = 1$. The normalization is performed in order to permit sorting of the data sets on a consistent basis, such as the slope of a line fit through the last $M_i$ data elements. Alternate methods of normalization may be used such as: a) dividing the vector by its mean or median or b) ranking the values in the vector and using the ranks instead of the vector values themselves in the regression.

In step 140, a line, $y'_{i,j} = a'_{i,j} + b'_i$, is fit through the $M_i$ data points elements $(x_{i,j}, y'_{i,j})$ $j=1$, $M_i$, using linear regression. The slope of the line, $a'_i$, is stored on the processor so that it may be used as a time series data set selection criterion. Alternate methods of data fitting may be used such as higher order polynomial regression or nonlinear regression. In this case, the average of the first derivatives would be stored on the processor as $a'_i$.

In step 150, if there are remaining vector data sets, steps 110-140 are repeated.

After each data set has been analyzed in steps 110-140, the results are reviewed in step 160 as in the first embodiment.

Generating the Trend Determination Parameters

Referring again to FIG. 1, once a time series data set has been selected and loaded in the processor, the trend determination parameters are selected at step 200. Inherent in this step is a processing of a portion of the time series to derive the parameters. The parameters include the Initial Window Size ($m_1$) and Deviation Limit ($L_s$) as discussed in the first embodiment, and an additional parameter, Initial Window Length ($\Delta X_1$), which is the size of the first window. This parameter is the minimum length of data needed to define a trend. It must have more than $m_1$ number of elements. In this embodiment, $m_1$ acts only as the minimum number of elements that must be in $\Delta X_1$. If this method is being applied to tick data for example, a value of $m_1=30$ over a time interval, $\Delta X_1=30$ minutes would represent reasonable values.

Each set of trend determination parameters in combination with the particular data fitting procedure, such as polynomial regression, produces a unique set of trends for a vector data set. At this step of the method, many different sets of trend determination parameters are used to produce corresponding sets of trends. These multiple sets of trends are then evaluated to determine which of the sets are better at matching the current data from the vector data set.

The trend determination parameters can be selected in several ways. In this embodiment, a subset of the vector, the first $M_2$ data points, representing some length $\Delta X_2$ of the vector, where $N_i$ is the number of data elements in the entire vector data set under evaluation, are selected for defining the trend determination parameters. However, the vector is not limited to the preferred implementation. The parameters can be derived from any vector including other financial vectors as well as one or more simulations of the vector. In this embodiment, the parameter selection is manual as in the first embodiment.

Referring now to FIG. 3, which is a detailed flowchart of the procedure for deriving the trend determination parameters. A set of trend determination parameters is generated in step 200 by looping in increments between minimum and maximum values for each of the trend determination parameters. The process is the same as in the first embodiment, except that M1MIN, M1MAX, and M1INC refer to the Initial Window Length ($\Delta X_1$).

Selecting a Set of Useful Trend Determination Parameters

Referring again to FIG. 1, at step 300 the values for each of the sets of trend determination parameters are evaluated in order to select one or more useful sets of trend determination parameters for a particular vector data set. This process is the same as in the first embodiment.

Processing the Vector Data Set with Trend Determination Parameter Sets

Referring again to FIG. 1, when one or more trend determination parameter sets are selected, they are applied to process the vector data set and to generate the trends at step 400. The result of this step is a refreshed set of trends for each trend determination parameter set as each new data point is considered for the time series.

FIG. 4A is a detailed flowchart for determining whether a new data point represents a continuation of a trend or not. For each selected trend determination parameter set ($\Delta X_1, L_s$), the latest trend is updated with each new sequential value of data for the vector data set. As in the first embodiment, a trend is described by a best-fit polynomial curve through all of the data within the trend and some length of values from the previous trend. As a consequence, the current trend is dynamic and will be updated as each value of new data arrives. Once the trend changes, the previous trends are no longer dynamic.

A new trend is defined to have begun as described in the first embodiment.

Referring now to FIG. 4A, which is a detailed flowchart of the processing of a time series at step 400 to determine the trends for a given trend determination parameter set ($\Delta X_1$, $L_s$). The processing is accomplished through the following steps:

In step 410, load the vector, ($x_{i,j}, y_{i,j}$), j=1, $N_i$, where $N_i$ is the number of elements in vector i.

Initialize the trend determination parameters in step 420. The parameters are $\Delta X_1$, the Initial Window Length; $L_s$, the deviation limit; and $\Delta X_2$, the second window size. In this preferred embodiment, $\Delta X_2$ is equal to $\Delta X_1$ for the first iteration and n+$\Delta X_1$ for subsequent iterations, where n is the number of points in a trend. This is the length of data values at the end of the trend's vector data set that are used to calculate a test measure of spread.

Set j to $\Delta m+1$ in step 430.

Set n, the number of points in the current trend to 0 in step 440.

For each trend, check to see if the current value, ($x_{i,j}, y_{i,j}$) is in the trend in steps 450-570.

For the First Trend

In step 450, select $\Delta X_2$ length of values from the beginning of the segment of interest in the vector data set. Because the number of data points represented by $\Delta X_2$ will probably be variable, represent the number of data points represented by $\Delta X_2$ be $\Delta m$.

In step 460, calculate a best-fit curve, $f_j(x)$, through the $\Delta m$ data points. ($x_{i,k}$, $y_{i,k}$), $x_{i,k}$=[k−(j−$\Delta m$)+1], k=(j−$\Delta m$), j−1. The subscript j in $f_j(x)$ refers to the function estimate at index j, when evaluating whether ($x_{i,j}, y_{i,j}$) is in the trend or not.

$$d_k = \left[\frac{(y_{i,k} - f_j(x_{i,k}))}{f_j(x_{i,k})}\right], k = (j-\Delta m), j-1 \quad (6)$$

Calculate the standard deviation, $s_{j-1}$, of the residuals, $d_k$ in step 500. This is similar to what is described in the first embodiment, except that there is a difference in the calculation of the statistics. The normal equation of the standard deviation is:

$$s_{j-1} = \sqrt{\frac{\sum_{k=1}^{\Delta m}(d_k - \bar{d})^2}{\Delta m}} \quad (7)$$

where $\bar{d}$ is the average of the $d_k$ values. However, this assumes a constant spacing between the sample values represented by $d_k$. Because the values in the vector are not sampled on a constant spacing, the values must be weighted to account for this non-constant spacing.

$$s_{j-1} = \sqrt{\sum_{k=1}^{\Delta m} w_k(d_k - \bar{d}')^2} \quad (8)$$

where $\bar{d}'$ is the weighted average of the $d_k$ values.

$$\bar{d}' = \sum_{k=1}^{\Delta m}(w_k d_k) \quad (9)$$

$$w_k = \frac{\frac{1}{2}(x_{i,k} - x_{i,k-1}) + \frac{1}{2}(x_{i,k+1} - x_{i,k})}{(x_{i,\Delta m} - x_{i,1})}, k = 2, (\Delta m - 1) \quad (10)$$

$$w_1 = \frac{\frac{1}{2}(x_{i,2} - x_{i,1})}{(x_{i,\Delta m} - x_{i,1})} \quad (11)$$

$$w_{\Delta m} = \frac{\frac{1}{2}(x_{i,\Delta m} - x_{i,\Delta m-1})}{(x_{i,\Delta m} - x_{i,1})} \quad (12)$$

and $\sum_{k=1}^{\Delta m} w_k = 1$.

The weighted population standard deviation is used in this embodiment; however, this is only one of many measures of the spread of a distribution. This patent includes, but is not limited to, other measures of spread, such as the sample standard deviation, the population or sample variance, range, inter-quartile range, differences between any quantiles of a distribution, or a measure of spread from a neural network.

Steps 510 through 570 are the same as in the first embodiment with the modifications to steps 450 through 500 as described previously.

For Subsequent Trends

Select $\Delta m+1$ values at step 450. $\Delta X_1$ length of the values are from the end of the previous trend, and n values are from the current trend.

Calculate the best-fit curve, $f_j(x)$, through the $\Delta m$ data points at step 460.

In step 470, evaluate the derivative $$\left.\frac{df_j(x)}{dx}\right|_{x_{i,j-i}}$$

at the point $x_{i,j-1}$, and obtain an estimated value of the curve, $f_j(x_{i,j})$ at index j.

In step 480, calculate the correlation coefficient (R) between the pairs of values, $[y_{i,k}, f_j(x_{i,k})]$, k=(j−$\Delta m$), j−1.

Calculate the residuals, $d_k$, between the time series values, $y_{i,j}$, and the trend values, $f_j(x_{i,j})$ in step 490. This is the same as in the first embodiment, except that $m_2$ has been replaced by $\Delta m$.

Calculate the standard deviation, $s_{j-1}$, of the residuals, $d_k$ in step 500 using equation 3. The weighted population standard deviation is used in this embodiment, however, this is only one of many measures of the spread of a distribution. The invention includes other measures of spread, such as the sample standard deviation, the population or sample variance, range, inter-quartile range, differences between any quantiles of a distribution, or a measure of spread from a neural network.

Steps 510 through 570 are the same as in the first embodiment with the modifications to steps 450 through 500 as described previously.

The procedure preferably outputs the same arrays for each trend parameter set as described in the first embodiment. The only difference is that instead of exporting the data array, $(y_{i,j})$, $j=1, N_i$, the routine will export the data pairs arrays, $(x_{i,j}, y_{i,j})$, $j=1, N_i$.

Determining Attributes of Each Trend

As in the first embodiment, a number of attributes of each of the trends are calculated or updated in step 600.

Referring now to FIG. 5, which is a post processing chart for the trends of a time series, steps 610 through 710 are the same as in the first embodiment, except for:

Determining the beginning time or location for each trend at step 620;

Determining the ending time or location for each trend at step 630;

Determining the average trend correlation at step 670; This will be a weighted average as described above in step 500.

Determining the average slopes or first derivatives of each trend at step 710. This will be a weighted average as described above in step 500.

9

DETAILED DESCRIPTION OF ALTERNATE EMBODIMENT

Time Series Data Elements with Multiple New Data Values

This embodiment refers to step 200 through 400 in FIG. 1. It is alternative method to describe the ability to consider adding multiple values to the trend at once versus only adding a single value at a time.

The difference is that instead of considering data elements to be individual points: $(x_{i,j}, y_{i,j})$, $j=1, N_i$, a data element is an aggregate of points within some neighborhood. For example, let $(x'_{i,j}, y'_{i,j})$, $j=1, N_a$ refer to aggregates of points, where $N_a$ is the number of aggregate points under consideration. $x'_{i,j}$ is a central measure of the location of the aggregate points, and $y'_{i,j}$ is an equivalent measure of the value of the aggregate of points. The central measures to use in considering the points would be mean, median, or mode. Each aggregate $(x'_{i,j}, y'_{i,j})$ is considered in steps 200 through 400 the same as an individual point $(x_{i,j}, y_{i,j})$ described in the first embodiment.

DETAILED DESCRIPTION OF ALTERNATE EMBODIMENT

Alternate Trend Type Curves

This embodiment refers to the method of fitting a trend or a curve to a portion of a time series or vector in step 140 in FIG. 2, and in step 460 in FIG. 4A.

In the description of the first embodiment, a polynomial as a trend to fit to the data points. The trend is not limited to a polynomial, nor to a polynomial of any particular order. This embodiment covers other types of trend curves. The curve can be another mathematical function, such as an exponential or logarithmic function. It could also be the estimate derived from a neural network or Kalman filter.

The trend may be represented as a polynomial curve by a function with parameters, such as $f_j(x)=a_0+a_1x+a_2x^2+a_3x^3+\Lambda$, where the parameters of the polynomial are the coefficients, $a_k$. Alternately, the trend may be represented as an exponential equation, such as $f_j(x)=b_0+b_1e^{b_2x}$, where the coefficients are $b_0$, $b_1$, $b_2$. Alternately, the trend may be represented as a logarithmic equation such as $f_j(x)=c_0+c_1 \log(c_2x)$ where the coefficients are $c_0$, $c_1$, $c_2$, and the logarithm is of any base including base 10, a natural logarithm, or other base.

A neural network can also be used to fit an estimated curve through a series of data points. There are many similarities between statistical tools and the function of a neural network (Sarle, W. S., "Neural Networks and Statistical Models" in *Proceedings of the Nineteenth Annual SAS Users Group International Conference*, April 1994, pp. 1538-1550. ftp://ftp.sas.com./pub/neural/neural1.ps.), even though the designer and user of the neural network may not be aware of them. As a consequence, a neural network may be used to fit a trend function to a time series data set or a vector data set. This embodiment covers the function of a neural network for this purpose.

A Kalman filter is a type of least squares filter that can also be used to fit a trend to a time series data set or vector data set. This embodiment covers the function of a Kalman filter for this purpose. More about Kalman filters can be found in Maybeck (Maybeck, Peter S., *Stochastic Models, Estimation, and Control: Volume* 1, Academic Press, New York, 1979.)

This embodiment is not limited to the mathematical functions described here. As known to one skilled in the art of data fitting, there are numerous mathematical functions that could be used to fit a trend to a time series or vector data set as well as hybrids that can include mathematical functions as well as a neural network for example.

DETAILED DESCRIPTION OF ALTERNATE EMBODIMENT

Normalization of Deviations by Trend

This embodiment refers to the method of normalization of the residuals or deviations by the trend value in steps 490 and 510 in FIG. 4A.

In the description of the first embodiment, the deviation of the data values from the trend curve is normalized by the trend curve value, $f_j(x_{i,j})$. The purpose of this is to ensure homoscedasticity of the deviations. If the series is trending up or down within a single trend, then the non-normalized deviations at the beginning of the trend will have a different variance than the non-normalized deviations at the end of the trend.

However, this also works well in most cases without the normalization, and this embodiment covers the case of not normalizing by dividing by the trend. I.e.

$$d_k=(y_{i,k}-f_j(x_{i,k})), k=(j-m_2), j-1 \quad (13)$$

Alternatively, other methods of normalization could be employed. For example, instead of dividing by a single trend value, the deviation may be normalized by dividing by a moving average of the trend.

DETAILED DESCRIPTION OF ALTERNATE EMBODIMENT

Alternate Normalization Methods

This embodiment refers to the method of normalizing a subset of the time series or vector data set in steps 130 in FIG. 2 and 400 in FIG. 4A.

In the description of the first embodiment, a portion of the time series is normalized by dividing all of the time series or vector data set values by the first value so that $y''_{i,1}=1$, where the normalized time series is designated as y'. The normalization is performed in order to permit sorting of the data sets on a consistent basis, such as on the average of the first derivatives of a curve fit through $M_1$ data elements. Alternate methods of normalization may be used such as dividing the time series its mean or median; ranking the values in the time series and using the ranks instead of the time series values themselves in the regression; or calculating the Fourier transform of the time series, zeroing the zero-th frequency contribution, and back-transforming the series back to the time domain. As known to one skilled in the art of data analysis, normalization is not limited to these methods.

For example, one of the outputs of step 400 is an array of the first derivatives of the normalized dynamic trend. The derivative of the trend fit to the normalized data values can be compared to the derivatives of the other trends for filtering purposes. The alternative methods of normalization described previously can also be applied to produce these values.

DETAILED DESCRIPTION OF ALTERNATE EMBODIMENT

Measure of Spread of Distribution

This embodiment refers to the method of calculating a measure of the spread of a subset of the time series or vector data set in step 500 and the use of the deviation limit, $L_s$, in step 420 in FIG. 4A.

In the description of the first embodiment, the standard deviation is used to calculate the spread of the residuals, $d_k$. Other measures of the spread of a distribution that can be used include variance; range; inter-quartile range; differences between any quantiles of a distribution; or a measure of spread from a neural network.

As known to one skilled in the art of data analysis, other measures of spread may be used. If these other measures of spread are used, then the deviation limit's definition must be generalized to account for these other measures of spread.

DETAILED DESCRIPTION OF ALTERNATE EMBODIMENT

Trend Determination: Single vs. Multiple Time Series or Vector Datasets

This embodiment refers to the time series or vector data sets that is used to derive the trend determination parameters in step 200, 300, and 400 in FIGS. 1 and 3.

In the first embodiment, the trend determination parameters were derived from a portion of the time series or vector data set. $M_2$ elements from the beginning of the time series data set, $y_{i,j}$, j=1, $N_j$, were selected for processing to get the trend determination parameter set.

However, the time series or vector data set is not limited to the first embodiment. The parameters can be derived from any time series or vector data set including other financial series as well as one or more simulations of time series. For example, if there are two time series that are highly correlated, the trend determination parameter can be derived and used for one of the time series, but also used for the other. In addition, one or more stochastic simulations of the time series or vector data sets can be used to derive the trend determination parameters. Multiple stochastic simulations can provide a more robust and refined estimate of what the parameters should be.

This embodiment includes these other sources of time series or vector datasets for the derivation of the trend determination parameter set.

DETAILED DESCRIPTION OF ALTERNATE EMBODIMENT

Alternatives to the Deviation Window Size ($m_2$)

This embodiment refers to an additional trend determination parameter ($m_2$) that is used in steps 200, 300, and 400 in FIGS. 1 and 3; and 420, 450-490, and 500 in FIG. 4A.

In the first embodiment, this trend determination parameter was a function of $m_1$, the first window size, and n, the number of data values from the current trend. In this respect, it was not variable, but simply a function of the two other parameters.

Figure 8:
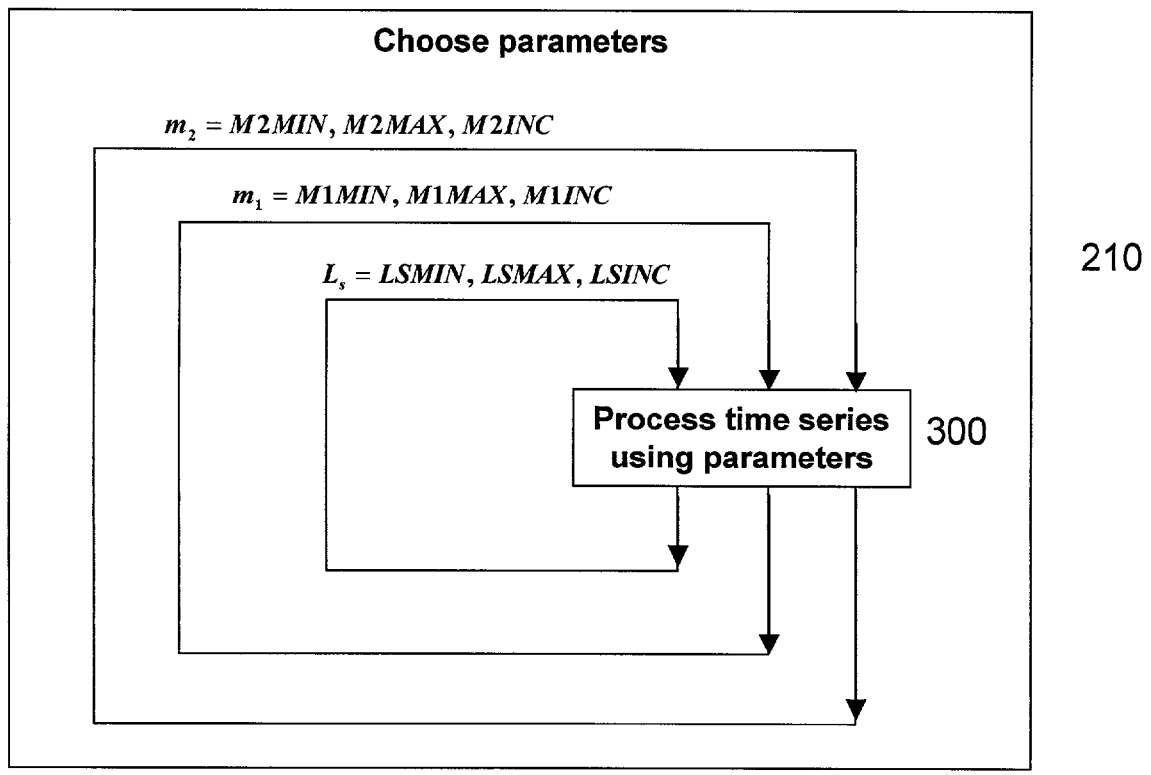
FIG. 8 is a detailed flowchart of the of the procedure for deriving the trend determination parameters for the embodiment—"Alternatives to the Deviation Window Size ($m_2$)"

In this embodiment, $m_2$ can be variable within the range $2 \leq m_2 \leq j-1$. FIG. 8 is a modification of FIG. 3 where step 200 has been replaced by step 210. A nested loop has been added to find the optimum parameter determination value for $m_2$ in step 210.

Referring to FIG. 8, which is a detailed flowchart of the procedure for deriving the trend determination parameters, a set of trend determination parameters is generated in step 210 by looping in increments between minimum and maximum values for each of the trend determination parameters. In this embodiment, three trend determination parameters are used—the Initial Window Size ($m_1$) which is evaluated between a starting value M1MIN and an ending value M1MAX in an increment M1INC; the Deviation Limit ($L_s$) which is evaluated between a starting value LSMIN and an ending value LSMAX in an increment LSINC; and a Deviation Window Size ($m_2$) which is evaluated between a starting value M2MIN and an ending value M2MAX in an increment M2INC. The order of the nesting is not important. Typical values for these variables are:

M2MIN=2
M2MAX=70
M2INC=1
M1MIN=3
M1MAX=70
M1INC=1
LSMIN=1
LSMAX=20
LSINC=0.5

The trend determination minimum, maximum, and increment parameters are determined through experience. If either of the selected trend determination parameter values are equal to M1MAX, M2MAX, or LSMAX for a selected trend set, then this would indicate the need to increase the LSMAX, M1MAX, or M2MAX values. The lower bound Initial Window Size, M1MIN, is limited by the order of the polynomial that one is using for the trend. For a linear trend (a line) one needs at least two points to fit a line. For second-order polynomials, one needs three points to fit a curve to the data points. The lower bound Deviation Window Size, M2MIN is limited by the number of points necessary to calculate a spread between two points or away from some central value.

In step 210, these values are generated in a nested loop resulting in approximately 175,000 sets of trend parameters. As in the first embodiment, the following values are calculated and exported the number of trends in the subset of the time series ($N_{Trends}$); the RMS Error between the input data values and trend values; the average length of the trends; the average trend length/$m_1$; the RMS Error/(Average length of the trends/$m_1$); and the RMS error*$L_s$. Each of these values is stored in the computer with its corresponding set of trend determination parameters ($m_1$, $m_2$, and $L_s$).

In FIG. 4A, the additional parameter, $m_2$, will be loaded with the others in step 420, not as a function of parameters $m_1$ and $L_s$, but as its own independent parameter. Instead of using $m_2$ in steps 450, 460, 470, and 480, ($m_1$+n) is used instead. $m_2$ directly affects how many deviations are calculated in step 490, and it is the number of deviation values that are used in the standard deviation calculation in step 500.

DETAILED DESCRIPTION OF ALTERNATE EMBODIMENT

Automatic Methods of Parameter Selection

This embodiment refers to step 200 and 300 in FIG. 1. It is alternative method to manually selecting the trend determination parameters.

Generating the Trend Determination Parameters

Referring again to FIG. 1, once a time series data set has been selected and loaded in the processor, the trend determination parameters are selected at step 200. Inherent in this step is a processing of a portion of the time series to derive the parameters. The parameters ($m_1$, $L_s$) are the same as in the first embodiment. Alternatively, they can be ($\Delta X_1$, $m_1$, $L_s$) as described in the second embodiment.

Inherent in step 200 is step 400. Step 400 is the same as in the first and second embodiments. What is changing in this embodiment is the structure of step 200 to choose the optimum parameters.

The goal is to find the set of parameter values ($m_1$, $L_s$) or ($\Delta X_1$, $m_1$, $L_s$) whose trends best fit the data. This involves minimizing some variable that generally includes an error term such as RMS Error.

As in the first embodiment, a subset of the time series, the first $M_2$ data points of the time series, where $N_i$ is the number of data points in the entire time series data set under evaluation, are selected for defining the trend determination parameters.

As described in the first embodiment, step 200 outputs a number of derived values related to the trends and the predictive error for each parameter set. Other derived values can also be produced, such as (RMS Error)/$N_{Trends}$; the RMS Error/$\Delta X_1$; RMS Error/(Average length of the trends/$\Delta X_1$); (RMS error*$L_s$)/$\Delta X_1$; or (RMS error*$L_s$)/(Average length of the trends/$\Delta X_1$).

Any one of these variables may be minimized with respect to the input trend determination parameters: ($m_1$, $L_s$) or ($\Delta X_1$, $m_1$, $L_s$). The error variable, such as RMS Error, may also be combined with other variables as outlined above to define a cost function to be minimized. The parameters may then be selected automatically using a local optimization algorithm, such as steepest descent or conjugate gradient, or by using a global optimization algorithm, such as simulated annealing, genetic algorithms, or any hybrid thereof. Optimization procedures are well known in the art, as outlined in reference texts like Chapter 10 of Press et al, "Numerical Recipes in C: The Art of Scientific Computing" (1989), Nocedal, Jorge and Stephen J. Wright, *Numerical Optimization*, Springer-Verlag, New York, 1999; Miller, Ronald E., *Optimization: Foundations and Applications*, John Wiley & Sons, Inc., New York, 2000 and Chong, Edwin K. P. and Stanislaw H. Zak, *An Introduction to Optimization*, John Wiley & Sons, Inc., New York, 1996.

DETAILED DESCRIPTION OF ALTERNATE EMBODIMENT

Other Measures of Fit

This embodiment refers to the error measure that is used in steps 200 and 400 in FIG. 1. It is alternative measure of how well the trends match the data.

In the description of the first embodiment, the RMS Error, a least squares measure, was used to define the error between the data points and the trend values. The error is not limited to being defined by the RMS error. This embodiment covers other methods that can be used to determine the fit of the trends to a set of points.

Other types of error measures such as other $\lambda_p$ norms, where p is a real number, may be used. The definition of the weighted $\lambda_p$ norm is (Tarantola, 1998):

$$\|x\|_p = \left[ \sum \frac{|x_i|^p}{(\sigma_i)^p} \right]^{\frac{1}{p}} \quad (14)$$

where $\sigma_i$ are weights. If $\sigma_i=1$ for all i, then that defines an unweighted $\lambda_p$ norm. Other measures could remove the $$\left(\frac{1}{p}\right)$$

superscript on the above equation.

For example, the $\lambda_1$ norm is very commonly used for robust estimation in problems that have large outliers (Tarantola, 1998). There are numerous other measures of error that can be employed based on probability distributions and are not limited to $\lambda_p$ norms. These include those based on a Lorentzian distribution, Andrew's sinc, and Tukey's biweight (Press et al, 1989).

DETAILED DESCRIPTION OF ALTERNATE EMBODIMENT

Selection of Parameter Set by Optimization of Objective Function

This embodiment refers to the method of fitting a trend or a polynomial to a time series in steps 140 in FIG. 2, and step 460 in FIG. 4A. Here are described alternative methods of fitting a trend or a polynomial to a time series.

In the description of the first embodiment, least squares regression was used to fit a polynomial to the data points. The method of fitting a trend to a time series is not limited to polynomial regression or non-linear regression. This embodiment covers other methods that can be used to fit trends to a set of points.

The coefficients, $a_k$ of a polynomial curve, $f_j(x) = a_0 + a_1 x + a_2 x^2 + a_3 x^3 + \Lambda$ or the coefficients, $b_0, b_1, b_2$ of an exponential equation $f_j(x) = b_0 + b_1 e^{b_2 x}$ can be determined by methods other than least squares regression.

In this embodiment, an error function is defined between the data values in the time series or vector y, and the function that is being fit to it, $f_j(x)$. The error function can be the RMS error or another form as described in an alternate embodiment. The goal is then to minimize the value of the error function as a function of the coefficients or parameters of the function.

The parameters or coefficients are selected automatically using a local optimization algorithm, such as, but not limited to, steepest descent or conjugate gradient or using a global optimization algorithm, such as, but not limited to, simulated annealing, genetic algorithms, or any hybrid thereof. Optimization procedures are well known in the art, as previously referenced.

DETAILED DESCRIPTION OF ALTERNATE EMBODIMENT

Trends are Broken if Deviation Exceeds $L_s$ Only

This embodiment refers to the determination that a trend has been broken in step 530 in FIG. 4A. In this embodiment, the test is modified to a single condition of whether the absolute value of the normalized deviation, $d'_j$, exceeds $L_s$ (equation 5): $\lfloor abs(d'_j) > L_s \rfloor$

DETAILED DESCRIPTION OF ALTERNATE EMBODIMENT

New Trend Determination Procedures or Correlation Coefficient Measure

This embodiment refers to an alternate criterion to determine the end of a trend in steps 200 and 400 in FIG. 1 and an alternative to steps 420 and steps 480 through 530 in FIG. 4A.

In the first embodiment, normalized residuals were calculated between the trend and the time series that the trend was being fit to. The time series value that under consideration was normalized by dividing by the standard deviation of the normalized residuals. If that value exceeded a deviation limit, and it was in the opposite direction to that of the trend, then the trend changed (equation 5). In this embodiment, a correlation coefficient measure is used instead of the residuals.

As a result of the different process to control the change of trend, there is a change to the parameters that are being used. The Initial Window Size ($m_1$) does not change, but instead of the Deviation Limit ($L_s$), a Correlation Limit ($L_C$) is used, where $L_C$ is defined as the lower limit of the correlation coefficient can reach to signal a new trend.

As a consequence, there is a slight change to how the trend determination parameters are selected in step 200 of FIG. 3. Correlation parameters LCMIN, LCMAX, and LCINC are used instead of LSMIN, LSMAX, and LSINC. Otherwise, the process of selecting parameters is the same. Typical values for these new parameters are:

LCMIN=0.1
LCMAX=0.95
LCINC=0.05

The same variables are calculated and exported from step 300, except the trend determination parameters ($m_1$, $L_C$) are changed.

In step 400, there are a few changes. A new trend is defined to have begun when one of the following occurs in step 530: (a) the derivative of the trend changes from positive to negative or vice versa, as in first embodiment; or (b) the correlation coefficient between the trend and the time series data values drops below $L_C$, the correlation coefficient limit.

Figure 9:
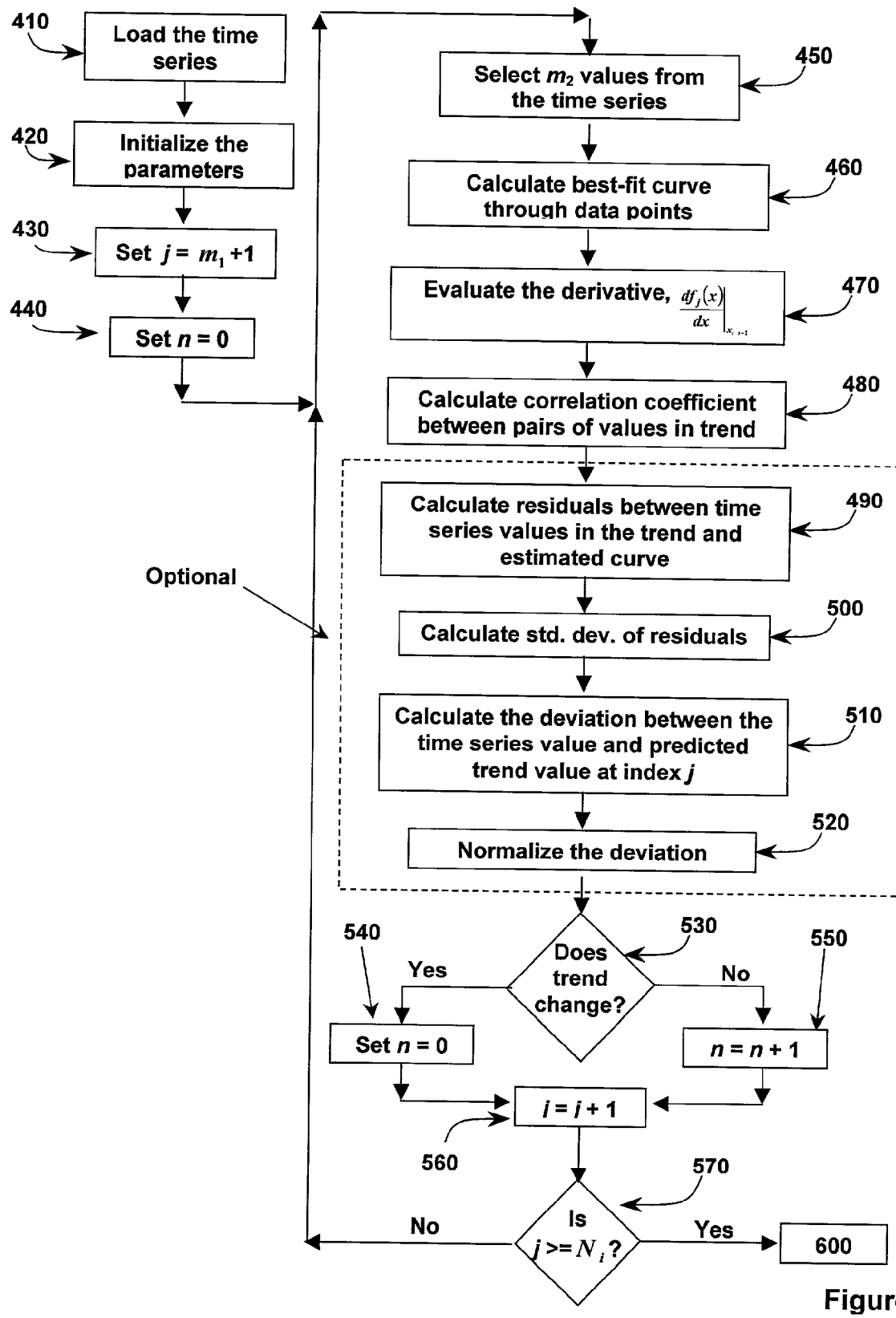
FIG. 9 is a detailed flowchart of the procedure for processing a time series to derive the trends for the "Correlation Coefficient Measure" embodiment.

The following steps have changed in step 400, and a modified diagram is shown in FIG. 9.

Initialize the trend determination parameters in step 420, where the parameters are $m_1$, the first window size; Correlation Limit ($L_C$), and $m_2$, the second window size.

Step 480 has changed to include the value under consideration in the calculation, so, $(y_{i,k}, f_j(x_{i,k}))$, $k=(j-m_2)$, j.

Steps 490, 500, 510, and 520 are optional.

Test to determine whether the trend has changed at step 530. In this embodiment, the trend changes if the sign of the first derivative has changed from the previous iteration to the current iteration. The trend also changes if the correlation coefficient, R, falls below $L_C$.

DETAILED DESCRIPTION OF ALTERNATE EMBODIMENT

Statistical Process Control Alternative

This embodiment refers to an alternate criterion to determine the end of a trend in steps 200 and 400 in FIG. 1. It describes modifications to steps 420 and 440 and alternatives to steps 200, and 520 through 560 in FIG. 4A.

In the first embodiment, normalized residuals were calculated between the trend and the time series that the trend was being fit to. The time series value that under consideration was normalized by dividing by the standard deviation of the normalized residuals. If that value exceeded a deviation limit, $L_s$, and it was in the opposite direction to that of the trend, then the trend changed (equation 5). In this embodiment, a number of values, $L_N$, will have to exceed $L_s$ to signal a new trend. The $L_N$ values can be either consecutive or non-consecutive within a given trend.

As a result of the different process to control the change of trend, there is a change to the parameters that are being used. The Initial Window Size ($m_1$) and Deviation Limit ($L_s$) do not change, but another variable, the Number Limit ($L_N$) is added, where $L_N$ is the maximum number of values that can drop below the Deviation Limit, $L_s$, to signal a new trend.

Figure 10:
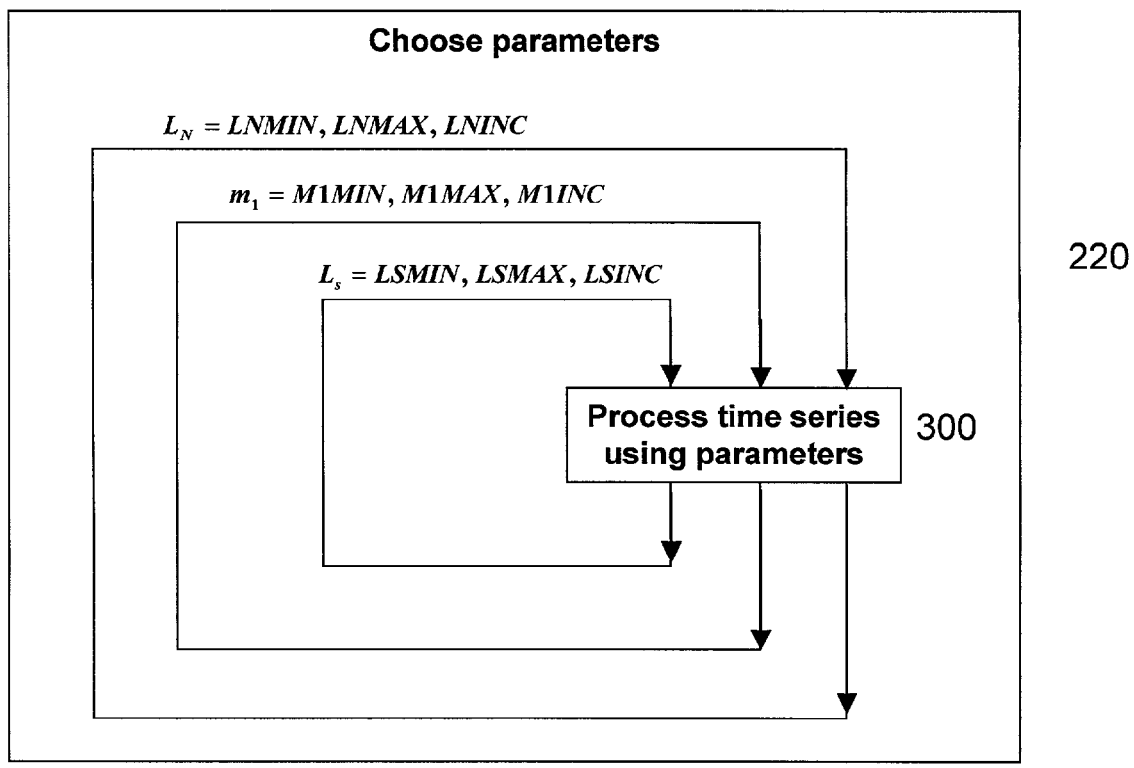
FIG. 10 is a detailed flowchart of the of the procedure for deriving the trend determination parameters for the embodiment—"Statistical Process Control Alternative"

FIG. 10 shows a modification of FIG. 3 to account for the additional parameter in step 200. Step 200 has been replaced by step 220. A nested loop has been added to find the optimum parameter determination value for $L_N$ in step 220.

The modification to the procedure as described in the first embodiment is the addition of a set of trend determination parameters. Referring to FIG. 10, which is a detailed flowchart of the procedure for deriving the trend determination parameters, a set of trend determination parameters is generated in step 220 by looping in increments between minimum and maximum values for each of the trend determination parameters. In this embodiment, three trend determination parameters are used—the Number Limit ($L_N$) which is evaluated between a starting value LNMIN and an ending value LNMAX in an increment LNINC.; the Initial Window Size ($m_1$) which is evaluated between a starting value M1MIN and an ending value M1MAX in an increment M1INC; and the Deviation Limit ($L_s$) which is evaluated between a starting value LSMIN and an ending value LSMAX in an increment LSINC. The order of the nesting is not important. Typical values for these variables are:

LNMIN=1
LNMAX=10
LNINC=1
M1MIN=3 (for a second order polynomial)
M1MAX=70
M1INC=1
LSMIN=1
LSMAX=20
LSINC=0.5

The trend determination minimum, maximum, and increment parameters are determined through experience. If either of the selected trend determination parameter values are equal to LNMAX, M1MAX, or LSMAX for a selected trend set, then this would indicate the need to increase the LNMAX, M1MAX, or LSMAX values. The lower bound Initial Window Size, M1MIN, is limited by the order of the polynomial that one is using for the trend. For a linear trend (a line) one needs at least two points to fit a line. For second-order polynomials, one needs three points to fit a curve to the data points. The lower bound Number Limit, LNMIN is limited by the how many points are needed to define a deviation that is larger than $L_s$ away from the trend.

In step 220, these values are generated in a nested loop resulting in approximately 25,000 sets of trend parameters. As in the first embodiment, the following values are calculated and exported: the number of trends in the subset of the time series ($N_{Trends}$); the RMS Error between the input data values and trend values; the average length of the trends; the average trend length/$m_1$; the RMS Error/(Average length of the trends/$m_1$); and the RMS error*$L_s$. Each of these values is stored in the computer with its corresponding set of trend determination parameters ($m_1$, $L_N$, and $L_s$). The difference is that the new trend determination parameter that has been added.

FIG. 4A is a detailed flowchart for determining whether a new data point represents a continuation of a trend or not. For each selected trend determination parameter set ($m_1$, $L_N$, and $L_s$), the latest trend is updated with each new sequential value of data for the time series data set.

A new trend is defined to have begun when one of the following occurs: (a) the derivative of the trend changes from positive to negative or vice versa as in the first embodiment; or (b) the number of times (LNCount) that the number of deviations that the difference between the last closing price or sequential data value and the predicted trend value meets or exceeds $L_s$, the deviation limit, is counted. The deviation is also the opposite direction to that of the trend. If the difference meets or exceeds $L_s$, but the deviation is in the same direction as that of the trend, then LNCount is not incremented. If LNCount is one, then this is the same as in the first embodiment. An alternative requirement is that the individual deviations must be consecutive to be counted.

Referring now to FIG. 4A, the following changes are made for this embodiment:

The additional parameter, $L_N$, is loaded with the others in step 420.

Step 440 is modified to set the number counter, LNCount=0.

Figure 11:
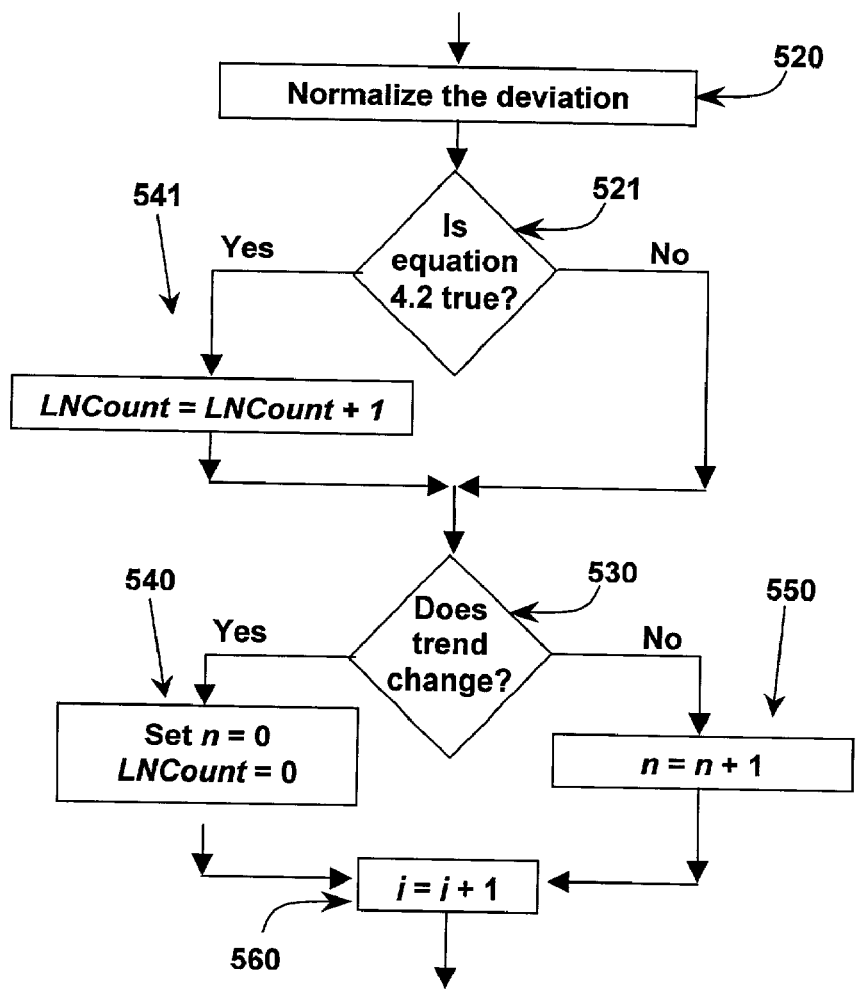
FIG. 11 is a detailed subset of the flowchart of the procedure for processing a time series to derive the trends for the embodiment—"Statistical Process Control Alternative"
Figure 12:
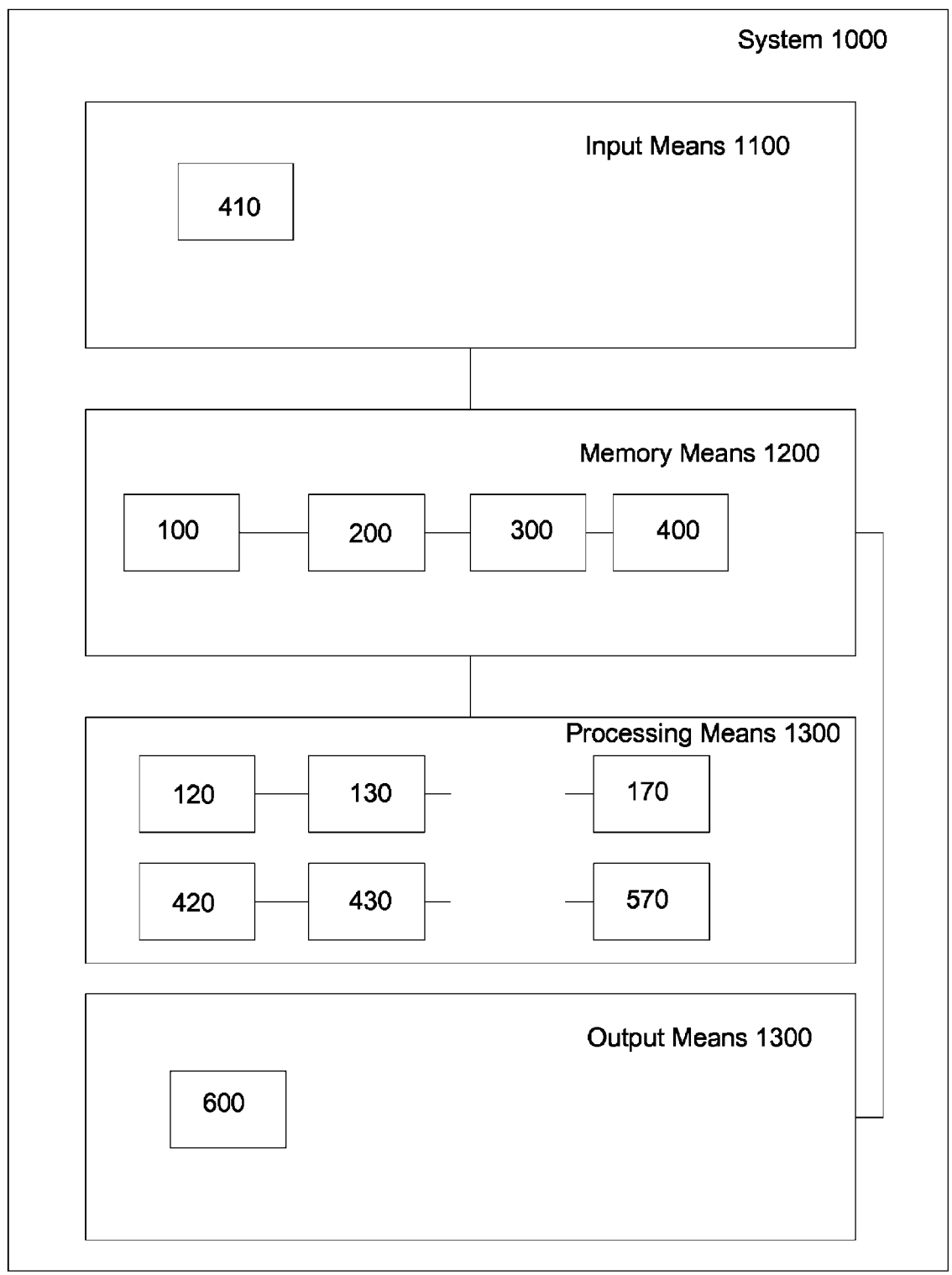
FIG. 12 is a system diagram showing a system 1000 with an input means 1100, a memory means 1200, a processing means 1300, and an output means 1400.

The steps between 520 and 560 are modified as is shown in FIG. 11. Steps 520 and 560 remain unchanged. The following describes the changes In step 521, test to determine whether the normalized deviation, $d'_j$, exceeds $L_s$ in the opposite direction to that which the trend is going; if so then LNCount is incremented in step 541.

Step 530 determines whether the trend has changed. If LNCount$\geq L_N$ or if the derivative of the trend has changed as described in the first embodiment (equation 4), then the trend has changed.

If the trend does not change at step 530, then increment n to n+1 at step 550.

If the trend does change at step 530, then set n=0 and LNCount=0 at step 540.

Increment j at step 560

DETAILED DESCRIPTION OF ALTERNATE EMBODIMENT

Flat Trend

This embodiment allows a flat trend to be specified. A flat trend is one that has a slope equal to zero. This embodiment describes modifications to step 400 in FIG. 1, 210 in FIG. 8, and steps 420, 460 through 480, and 530 FIG. 4A.

In this embodiment, the trend will change to a zero trend with the same value as the last point, $f_{j-1}(x_{i,j})$, if the derivative of the trend has changed sign as described in the first embodiment (equation 4). If the absolute value of the deviation from the trend exceeds $L_s$ as described in the first embodiment (equation 5), then the new trend will form as described in the first embodiment.

As a result of the adding a flat trend, there is a change to the parameters that are being used. The Initial Window Size ($m_1$) and Deviation Limit ($L_s$), do not change, but the Deviation Limit is redefined to only apply to non-zero trends. Another deviation limit, the Flat Trend Deviation Limit ($L_F$), is the limit that must be exceeded when the trend is a flat trend to define a new trend. Since $L_F$ is also a deviation measure, the same description as to what type of measure $L_s$ is (standard deviation, variance, range, etc.), also applies to $L_F$.

As a consequence, there is a slight change to how the trend determination parameters are selected in step 210 in FIG. 8. Flat Trend Deviation Limit parameters LFMIN, LFMAX, and LFINC are used instead of M2MIN, M2MAX, and M2INC. Otherwise, the process of selecting parameters is the same. Typical values for these new parameters are:

LFMIN=1.0

LFMAX=20.0

LFINC=0.5

The same variables are calculated and exported from step 300, except the trend determination parameters ($m_1$, $L_s$, $L_F$) are changed.

In step 400, there are a few changes:

A new flat trend begins when the derivative of the trend has changed sign as described in the first embodiment (equation 4). If the trend is flat, then a new trend will be defined when the normalized deviation exceeds $L_F$ in step 530:

Initialize the trend determination parameters in step 420. The parameters are $m_1$, the first window size; $L_s$, the deviation limit; $L_F$ the flat trend deviation limit; and $m_2$, the second window size.

Step 460 will change if the trend is flat. If it is flat, then the value of the trend is simply the previous value of the trend.

The derivative in step 470 will be zero if the trend is flat.

The correlation coefficient in step 480 is zero.

Steps 490, 500, 510, and 520 are the same as in the first embodiment.

Test to determine whether the trend has changed at step 530. If the derivative of the trend has changed sign as described in the first embodiment (equation 4), then the trend changes to a flat trend and the value of the trend is $f_{j-1}(x_{i,j})$, the predicted trend value from the previous iteration. If the trend is flat, then the trend will only be changed if $\lfloor abs(d'_j) > L_F \rfloor$.

DETAILED DESCRIPTION OF ALTERNATE EMBODIMENT

Residuals From the Current Trend vs. Residuals From the Predictions

This embodiment considers how the residuals are calculated in step 490. In the first embodiment, the residuals are calculated between the trend and its input values. In this embodiment, the residuals are calculated from the difference between the predicted trend and the data element or elements that are being evaluated to determine whether the elements are part of the trend or not. These residuals are accumulated with every iteration, so that the standard deviation of the residuals can be calculated in step 500.

For the first iteration of the each trend, the residuals are calculated the same way as in the first embodiment. For subsequent iterations, the following changes are noted:

In step 490, accumulate the residuals $d_{j-1}$ that were calculated between the predicted trend value and the actual value $y_{i,j-1}$, at the previous iteration (j−1) in step 510. Since $d_{j-1}$ is already normalized by dividing by the trend, there is no reason to normalize in this step.

The only change to step 510 is that the residual is saved for step 490 in the next iteration if the trend doesn't change.

Otherwise, all other steps are the same.

DETAILED DESCRIPTION OF ALTERNATE EMBODIMENT

Moving Window From the Previous Trend

This embodiment allows the number of $m_1$ elements from the previous trend to shrink with each iteration. This allows the effect of the previous trend to have a temporal effect on the current trend. Step 450 doesn't change for the first trend. However it changes in the following manner for subsequent trends.

Select $m_2$ values at step.

$$m_2 = \begin{cases} n + (m_1 - n), & \text{if } n < m_1 \\ n, & \text{if } n \geq m_1 \end{cases},$$

where n is the length of the current trend. Therefore, for the first $m_1$ iterations, the number of elements that are used to fit the trend is constant and equal to $m_1$. The data elements that are used to fit the trend represent a moving window that slides through the data with each additional data element. Once $m_1$ iterations have occurred, and the trend is continuing, the data elements that are used to fit the trend only come from the current trend.

DETAILED DESCRIPTION OF ALTERNATE EMBODIMENT

Alternate Location For Calculating the Derivative of the Trend

This embodiment allows for a different location for calculating the derivative of the trend in step 470 in FIGS. 4A and 9. In the first embodiment, the derivative of the trend is taken at the j−1th index of the data elements, $x_{i,j-1} = m_2$. In some cases, there may be an advantage to taking the derivative at another location. For example, the derivative, $$\left. \frac{df_j(x)}{dx} \right|_{x_{i,j}},$$

may be taken at the jth index, $x_{i,j} = m_2 + 1$.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wood parts, a nail and a screw may be equivalent structures.

What is claimed is:

1. A computer system for breaking a time series into a plurality of discontinuous trends, the system comprising:
    an input means for inputting time series data to a computer, the time series comprising a plurality of data elements, at least a portion of which represents a trend which is generally increasing or decreasing;
    a memory means for storing the time series data;
    a processing means for
        selecting a plurality of sets of trend determination parameters for the time series, each set of trend determination parameters comprising at least one window size, such that the window size defines a number of adjacent data elements from the time series to be used to generate trends;
        selecting a useful group of sets of trend determination parameters for the time series from the plurality of sets of trend determination parameters, such that the useful group of sets includes at least one member;
        processing the time series with each member of the useful group of sets of trend determination parameters to generate a set of trends and trend attributes for each member;
        evaluating the trend attributes for each member;
        selecting at least one set of trends; and
    an output means for outputting the set of trends from the computer.

2. The system of claim 1 wherein the processing means further comprises
    deciding, based on the composite results of a plurality of the members of the useful group of sets of trend determination parameters, whether the newest data element of the time series represents a continuation of a trend, such that the trend is increasing, decreasing, or flat.

3. The system of claim 1 wherein inputting time series data to a computer further comprises
    inputting a plurality of time series data sets to the computer; and
    selecting a particular time series from a plurality of time series data sets.

4. The system of claim 1 wherein inputting time series data to a computer further comprises
inputting a plurality of vector datasets to the computer; and
selecting a particular vector data set from a plurality of time series data sets.

5. The system of claim 3 wherein selecting a particular time series from a plurality of time series data sets further comprises
for each of the plurality of time series data sets:
selecting at least a portion of the elements in the data set to create a selected data subset;
normalizing the selected data subset to generate a normalized subset for the time series;
storing the normalized subset on the computer;
calculating, on a processor, the slope of a best-fit polynomial regression through the normalized subset; and
selecting a particular time series that has a large absolute slope and a large correlation coefficient between the trend and the data elements.

6. The system of claim 1 wherein the processing means further comprises
specifying a range of values for each of a plurality of trend determination parameters; and
generating the sets of trend determination parameters by selecting unique combinations of trend determination parameter values, such that the values are within the range of values for each of the plurality of trend determination parameters.

7. The system of claim 6 wherein specifying a range of values for each of a plurality of trend determination parameters further comprises
specifying a minimum value for a first trend determination parameter of initial data window size;
specifying a maximum value for a first trend determination parameter of initial data window size;
specifying a minimum value for a second trend determination parameter of deviation limit; and
specifying a maximum value for a second trend determination parameter of deviation limit.

8. The system of claim 1 wherein the processing means further comprises
specifying a range of potential values for each of a plurality of trend determination parameters;
creating an objective function from at least one indications of trend results, such that the objective function generates a resultant value for a set of trend determination parameters; and
selecting a useful group of sets of trend determination parameters by applying an optimization procedure to the objective function and the range of potential values for each of the plurality of trend determination parameters.

9. The system of claim 1 wherein selecting a useful group of sets of trend determination parameters for the time series from the plurality of sets of time series parameters further comprises
for each trend determination parameter set:
applying the trend determination parameters to at least a portion of the time series data elements, thereby generating at least one trend and at least one trend attribute parameter;
identifying the dynamic trend and at least one dynamic trend attribute parameter;
calculating at least one indication of trend results between the time series and the trend set; and storing at least one indication of trend results on the computer; and
selecting at least one set of trend determination parameters based on at least one indication of trend results for each of the sets.

10. The system of claim 9 wherein applying the trend determination parameters to at least a portion of the time series data elements thereby generating at least one trend and at least one trend attribute parameter further comprises
assigning each of the data elements to at least one trend by generating a first trend with at least a portion of the data elements;
identifying the first trend as the current trend;
evaluating each subsequent data element to determine whether the data element is a continuation of the current trend, and assigning the data element to the current trend if it is a continuation of the current trend, and assigning the data element to a new trend if it is not continuation of the current trend, and identifying the new trend as the current trend; and
determining at least one trend attribute for each trend.

11. The system of claim 9 wherein calculating at least one indication of trend results between the time series and trend set further comprises
calculating at least one measure from the group consisting of: the number of trends in the subset of the time series, the RMS Error between the input data values and trend values, the average trend length; the average trend length divided by the minimum number of data points needed to define a trend (window size parameter), the average percent return of the trends, the summed cumulative percent return of the trends; the fraction of correct predictions, the fraction of incorrect predictions, the quotient of the root mean square error and the average length of the trends divided by the minimum number of data points needed to define a trend, and the RMS error*$L_s$ the efficiency of the trends, where efficiency is defined as the average return of the trends divided by the average length of the trends, and compounded return of the trends.

12. The system of claim 9 wherein selecting at least one set of trend determination parameters based on at least one indication of trend results for each of the sets further comprises
plotting on a graph a representative data point for each of the plurality of sets of trend determination parameters and its associated trend results, where a first axis represents a first measure of trend results and a second axis represents a second measure of trend results; and
selecting from the graph at least one data point that represents a trend determination parameters set that has desirable trend results.

13. The system of claim 12 wherein plotting on a graph a representative data point for each of the plurality of sets of trend determination parameters and their associated trend results and selecting from the graph at least one data point that represents a parameters set that has desirable trend results further comprises
plotting on a graph a representative data point for each of the plurality of sets of trend determination parameters, where the y-axis represents the product of the root mean square error and the deviation limit for the set of trend determination parameters, and the x-axis represents the average trend length for the set of trend determination parameters; and
selecting at least one set of trend determination parameters associated with a point from the graph that has a minimum value for the product of the root mean square error and the deviation limit for a given average trend length.

14. The system of claim 12 wherein plotting on a graph a representative data point for each of the plurality of sets of trend determination parameters and their associated trend results and selecting from the graph at least one data point that represents a parameters set that has desirable trend results further comprises plotting on a graph a representative data point for each of the plurality of sets of trend determination parameters, where the y-axis represents the root mean square error for the set of trend determination parameters, and x-axis represents the average trend length for the set of trend determination parameters; and selecting at least one set of trend determination parameters associated with a point from the graph that has a minimum value for the root mean square error for a given average trend length.

15. The system of claim 12 wherein plotting on a graph a representative data point for each of the plurality of sets of trend determination parameters and their associated trend results and selecting from the graph at least one data point that represents a parameters set that has desirable trend results further comprises plotting on a graph a representative data point for each of the plurality of sets of trend determination parameters, where the y-axis represents the summed cumulative percent return of the trends for the set of trend determination parameters, and x-axis represents the average percent return for the set of trend determination parameters; and selecting at least one set of trend determination parameters associated with a point from the graph that has a maximum value for both the summed cumulative percent return and the average percent return.

16. The system of claim 12 wherein plotting on a graph a representative data point for each of the plurality of sets of trend determination parameters and their associated trend results and selecting from the graph at least one data point that represents a parameters set that has desirable trend results further comprises plotting on a graph a representative data point for each of the plurality of sets of trend determination parameters, where the y-axis represents the summed cumulative percent return of the trends for the set of trend determination parameters, and x-axis represents the fraction of correct predictions for the set of trend determination parameters; and selecting at least one set of trend determination parameters associated with a point from the graph that has a maximum value for both the summed cumulative percent return and the fraction of correct predictions.

17. The system of claim 12 wherein plotting on a graph a representative data point for each of the plurality of sets of trend determination parameters and their associated trend results and selecting from the graph at least one data point that represents a parameters set that has desirable trend results further comprises plotting on a graph a representative data point for each of the plurality of sets of trend determination parameters, where the y-axis represents the average percent return of the trends for the set of trend determination parameters, and x-axis represents the fraction of correct predictions for the set of trend determination parameters; and selecting at least one set of trend determination parameters associated with a point from the graph that has a maximum value for both the average percent return and the fraction of correct predictions.

18. The system of claim 12 wherein plotting on a graph a representative data point for each of the plurality of sets of trend determination parameters and their associated trend results and selecting from the graph at least one data point that represents a parameters set that has desirable trend results further comprises plotting on a graph a representative data point for each of the plurality of sets of trend determination parameters, where the y-axis represents the average percent return for the trends for the set of trend determination parameters, and x-axis represents the average trend length for the set of trend determination parameters; and selecting at least one set of trend determination parameters associated with a point from the graph that has a maximum value for the average percent return for a given average trend length.

19. The system of claim 9 wherein selecting at least one set of trend determination parameters based on at least one indication of trend results for each of the sets further comprises specifying an objective function that incorporates at least one measure of trend results, such that minimization of the objective function produces desirable trend results;

applying an optimization technique to the objective function such that the optimization technique minimizes the objective function; and selecting at least one set of trend determination parameters as a result of minimizing the objective function.

20. The system of claim 1 wherein processing the time series with each member of the useful group of sets of trend determination parameters to generate a set of trends and trend attributes for each member further comprises for each member applying the trend determination parameters to at least a portion of the time series data elements, thereby generating at least one trend and at least one trend attribute parameter; and identifying the dynamic trend and at least one dynamic trend attribute parameter; and storing at least one dynamic trend attribute parameter on the computer.

21. The system of claim 20 wherein applying the trend determination parameters to at least a portion of the time series data elements thereby generating at least one trend and at least one trend attribute parameter further comprises assigning each of the data elements to at least one trend by generating a first trend with at least a portion of the data elements;

identifying the first trend as the current trend;

evaluating each subsequent data element to determine whether the data element is a continuation of the current trend, and assigning the data element to the current trend if it is a continuation of the current trend, and assigning the data element to a new trend if it is not continuation of the current trend, and identifying the new trend as the current trend; and determining at least one trend attribute for each trend.

22. The system of claim 21 wherein generating a first trend with at least a portion of the data elements further comprises recalling the first trend determination parameter, the data window size, from the set of trend determination parameters; forming a proposed trend data set by selecting a number of data elements from the time series, such that the number of data elements selected is at least as large as the value of the data window size trend determination parameter;

calculating a first best-fit curve through the proposed trend data set; and identifying the best fit curve as the first trend.

23. The system of claim 21 wherein evaluating each subsequent data element to determine whether the data element is a continuation of the current trend further comprises forming a proposed trend data set from the selected data elements; calculating a new best-fit curve through the proposed trend data set; calculating at least one measure of predictive error for the new best-fit curve with respect to the values of the data elements in the proposed trend data set; projecting the best-fit curve to the location of the subsequent data element;

evaluating the deviation of the subsequent data element from the projected best-fit curve value at the new location; and applying at least one acceptance criteria to the measure of predictive error, and if the acceptance criteria is met, setting the subsequent data element to the proposed trend data set, identifying the new best-fit curve as the current trend, and if the acceptance criteria is not met, setting the subsequent data element to a new trend set, determining a new trend, and identifying the new trend as the current trend.

24. The system of claim 23 wherein calculating at least one measure of predictive error for the new best-fit curve with respect to the values of the data elements in the proposed data set further comprises evaluating the derivative of the best-fit curve;

obtaining an estimated value of the best-fit curve at the new element; calculating the residuals between the proposed trend data set and the new best-fit curve;

normalizing the residuals; quantifying the spread of the distribution of the normalized residuals;

calculating the deviation of predicted trend value at the new element from the actual value of the new element; and normalizing the deviation of predicted trend value at the new element from the actual value of the new element using the spread of the distribution of normalized residuals.

25. The system of claim 23 wherein applying at least one acceptance criteria to the measure of predictive error further comprises designating a first test criterion as true if the sign of the derivative of the trend curve generated through the proposed trend dataset changes compared to the sign of the derivative of the trend curve generated previously;

designating a second test criterion as true if the absolute value of normalized deviation exceeds the deviation limit parameter;

designating a third test criterion as true if the absolute value of normalized deviation exceeds the deviation limit parameter and the normalized deviation is in the opposite direction as the direction of the trend as designated by the derivative of the trend curve through the proposed trend dataset;

designating a fourth test criterion as true if the correlation coefficient between the proposed trend curve and the proposed trend dataset decreases below the correlation limit parameter;

designating a fifth test criterion as true if the number of times that the absolute value of normalized deviation exceeds the deviation limit parameter; and the normalized deviation is in the opposite direction as the direction of the trend as designated by the derivative of the trend curve through the proposed trend dataset;

exceeds the number of values parameter;

designating a sixth test criterion as true if the absolute value of the normalized deviation from a flat trend exceeds the flat trend deviation limit; and determining whether at least one of the first, second, third, fourth, fifth, and sixth test criteria is true.

* * * * *